(12) United States Patent
Harpal et al.

(10) Patent No.: US 10,823,112 B2
(45) Date of Patent: Nov. 3, 2020

(54) METHOD FOR MANUFACTURING AND ASSEMBLY OF A THRUST REVERSER CASCADE

(71) Applicant: THE BOEING COMPANY, Chicago, IL (US)

(72) Inventors: Naimishkumar Harpal, Everett, WA (US); Chen Chuck, Mercer Island, WA (US); Zachariah VanDeMark, Snohomish, WA (US); Tunde A. Olaniyan, Bothell, WA (US); Minkoo Han, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 370 days.

(21) Appl. No.: 15/605,120

(22) Filed: May 25, 2017

(65) Prior Publication Data
US 2018/0340492 A1    Nov. 29, 2018

(51) Int. Cl.
| *F02K 1/54* | (2006.01) |
| *F02K 1/72* | (2006.01) |
| *F02K 1/80* | (2006.01) |
| *F02K 1/64* | (2006.01) |

(52) U.S. Cl.
CPC .............. *F02K 1/54* (2013.01); *F02K 1/64* (2013.01); *F02K 1/72* (2013.01); *F05D 2230/51* (2013.01); *F05D 2230/60* (2013.01); *F05D 2240/129* (2013.01); *F05D 2240/40* (2013.01)

(58) Field of Classification Search
CPC ... F02K 1/54; F02K 1/62; F02K 1/625; F02K 1/70; F02K 1/72; F02K 1/80; F05D 2230/51; F05D 2230/60; F05D 2240/129
See application file for complete search history.

(56) References Cited

U.S. PATENT DOCUMENTS

| 2,345,200 | A | 3/1944 | Ilknayan |
| 3,024,604 | A | 3/1962 | Morley |
| 3,076,309 | A | 2/1963 | Brown et al. |
| 3,795,559 | A | 3/1974 | Horn et al. |
| 4,165,609 | A | 8/1979 | Rudolph |

(Continued)

FOREIGN PATENT DOCUMENTS

| CN | 88103525 A | 12/1988 |
| CN | 102741045 A | 10/2012 |

(Continued)

OTHER PUBLICATIONS

Extended European Search Report for EP Application No. 18152219.4 dated Jul. 17, 2018.

(Continued)

*Primary Examiner* — Andrew H Nguyen
(74) *Attorney, Agent, or Firm* — Marshall, Gerstein & Borun LLP

(57) ABSTRACT

A method for manufacturing a cascade for a thrust reverser for a jet engine includes forming a strip assembly. The strip assembly includes a strong back member which includes a length. The strip assembly includes a plurality of first vane members which extend from a first side of the strong back member in a first direction nonparallel relative to the length of strong back member wherein the plurality of the first vane members are spaced apart from one another along the length of the strong back member.

20 Claims, 19 Drawing Sheets

(56) References Cited

U.S. PATENT DOCUMENTS

| | | | |
|---|---|---|---|
| 4,183,478 | A | 1/1980 | Rudolph |
| 4,722,821 | A | 2/1988 | Vermilye |
| 4,778,110 | A | 10/1988 | Sankey et al. |
| 4,852,805 | A | 8/1989 | Vermilye |
| 4,892,462 | A | 1/1990 | Barbier et al. |
| 5,128,192 | A | 7/1992 | Narasaki |
| 5,152,860 | A | 10/1992 | Grossman et al. |
| 5,348,601 | A | 9/1994 | Ray |
| 5,399,395 | A | 3/1995 | Forman et al. |
| 5,576,079 | A | 11/1996 | Forman et al. |
| 5,624,618 | A | 4/1997 | Forman et al. |
| 5,789,060 | A | 8/1998 | Marshall et al. |
| 6,557,338 | B2 | 5/2003 | Holme et al. |
| 6,558,608 | B2 | 5/2003 | Haraldsson et al. |
| 6,830,718 | B2 | 12/2004 | Maumus et al. |
| 7,007,454 | B2 | 3/2006 | Dehu et al. |
| 7,998,299 | B2 | 8/2011 | McCarville et al. |
| 8,333,858 | B2 | 12/2012 | Rubin et al. |
| 8,484,944 | B2 | 7/2013 | Urban et al. |
| 8,583,271 | B2 | 11/2013 | Engelbart et al. |
| 8,608,890 | B2 | 12/2013 | Everhart et al. |
| 9,086,034 | B2 | 7/2015 | Aten et al. |
| 9,102,103 | B2 | 8/2015 | Fox et al. |
| 9,120,246 | B2 | 9/2015 | Oldroyd et al. |
| 9,145,277 | B2 | 9/2015 | Kendrick et al. |
| 9,211,618 | B2 | 12/2015 | Hethcock et al. |
| 9,314,941 | B2 | 4/2016 | Wallen et al. |
| 9,587,582 | B1 * | 3/2017 | Schaefer ................ F02K 1/72 |
| 9,895,840 | B2 | 2/2018 | Bartel et al. |
| 2001/0001409 | A1 | 5/2001 | Weight et al. |
| 2004/0088858 | A1 * | 5/2004 | Holme .................... F02K 1/54 |
| | | | 29/889.22 |
| 2006/0005530 | A1 * | 1/2006 | Blin ........................ F02K 1/72 |
| | | | 60/226.2 |
| 2012/0021165 | A1 | 1/2012 | Hethcock et al. |
| 2012/0036716 | A1 | 2/2012 | Urban et al. |
| 2012/0119417 | A1 | 5/2012 | Everhart et al. |
| 2012/0189798 | A1 | 7/2012 | Goering et al. |
| 2012/0228467 | A1 | 9/2012 | Wallen et al. |
| 2013/0092755 | A1 | 4/2013 | Aten et al. |
| 2016/0263820 | A1 * | 9/2016 | Kruckenberg ........ B29C 66/301 |

FOREIGN PATENT DOCUMENTS

| | | |
|---|---|---|
| EP | 0219889 A2 | 4/1987 |
| EP | 2518593 A1 | 10/2012 |
| EP | 2944452 A2 | 11/2015 |

OTHER PUBLICATIONS

State Intellectual Property of China Second Notification of Office Action, dated Jul. 18, 2017, regarding Appln No. 201510249918.4, 16 pages.

State Intellectual Property of China First Notification of Office Action, dated May 15, 2014, regarding Appln No. 201510249918.4, 18 pages.

Canadian Intellectual Property Office Examination Report, dated Jan. 31, 2017, regarding Appln No. 2,884,995, 3 pages.

Extended European Search Report for EP Application No. 15167817.4 dated Feb. 4, 2016, 11 pages.

Canadian Intellectual Property Office Examination Report, dated Mar. 24, 2016, regarding Appln No. 2,884,995, 3 pages.

Application filed for U.S. Appl. No. 16/003,842, 76 pages.

Application filed for U.S. Appl. No. 15/837,604, 49 pages.

Application filed for U.S. Appl. No. 16/139,449, 36 pages.

* cited by examiner

METHOD FOR MANUFACTURING AND ASSEMBLY OF A THRUST REVERSER CASCADE

FIELD

This disclosure relates to a cascade for a thrust reverser for a jet engine and more particularly to a method of manufacturing and assembling of the cascade.

BACKGROUND

Thrust reversers are devices used to turn jet engine exhaust to a direction with a sufficient forward component to create reverse thrust to enable aerodynamic breaking during an airplane landing maneuver. A cascade is a component of the thrust reverser assembly mounted to a nacelle of a jet engine. A blocker door of the thrust reverser assembly directs exhaust air flow to and through the cascade and the cascade configuration further directs the exhaust air flow which exits the cascade.

A cascade typically includes surfaces which will selectively direct the exhaust flow in forward and side directions. The direction of the exhaust air flow is tailored by the direction of the surfaces of vanes and strong backs within the cascade. Vane surfaces selectively direct the exhaust air flow in a forward direction and strong backs selectively direct the exhaust air flow in a side-turning direction. Cascades, as a result of having surfaces which direct exhaust air flow in varied directions, have a complex shape. The complex shape results in considerable labor, cost and turnaround time for production.

Cascades have been made conventionally with composite material by way of hand layups. This fabrication methodology is labor intensive and results in a high cost. Other methods of manufacturing cascades has included compression mold thermoplastic manufacturing processes which is less labor intensive but which has complex four sided mold designs which result in requiring complicated mold shapes. With the cascade having four sided structures, this configuration has necessitated complicated installation, removal and tracking procedures of these molded pieces which add cost penalties with respect to labor efforts required and the length of time of the process.

Although the above compression mold thermoplastic manufacturing process can be streamlined to reduce manufacturing cost, the streamlining requires simplification of the aerodynamic lines of the cascade geometry which directs the exhaust air flow. As a result of simplification of the aerodynamic lines of the cascade geometry, the reverse thruster aerodynamic performance is penalized. To compensate for the reduced aerodynamic performance relatively larger cascades are required. These cascades are typically required to be longer. This increase in size further contributes to increased weight and installation challenges such as, the aerolines of the fan outer wall and external nacelle, longer actuators etc. Any change in aerolines requires re-certification costs and further additional testing costs.

There is a need to manufacture cascades which perform the needed function of directing exhaust air flow from the jet engine. The cascade will need to direct the exhaust air flow in various directions so as to avoid imparting wear onto different parts of the aircraft and to direct flow in a forward direction of the aircraft to slow down the speed of the aircraft after the aircraft has touched down on the airstrip in a landing maneuver. The manufacturing of cascades also needs to be less labor intensive and less expensive without compromising the needed aerodynamic performance of the cascade which would otherwise place increased challenges on installation and impose cost penalties associated with re-certification.

SUMMARY

An example of a method for manufacturing a cascade for a thrust reverser for a jet engine includes forming a strip assembly. The strip assembly includes a strong back member which includes a length. The strip assembly also includes a plurality of first vane members which extend from a first side of the strong back member in a first direction nonparallel relative to the length of strong back member wherein the plurality of the first vane members are spaced apart from one another along the length of the strong back member.

An example of a method of assembling a cascade for a thrust reverser for a jet engine includes the steps of placing a strip assembly into a first position wherein the strip assembly includes a strong back member having a length. The strip assembly further includes a plurality of first vane members which extend from a first side of the strong back member in a first direction nonparallel relative to the length of strong back member wherein the first vane members are spaced apart from one another along the length of the strong back member. The method further includes placing a second strip assembly into a second position wherein the second strip assembly includes a second strong back member which includes a length. The second strip assembly further includes a plurality of third vane members which extend from a second side of the second strong back member in a third direction nonparallel relative to the length of the second strong back member wherein the plurality of third vane members are spaced apart from one another along the length of the second strong back member. With the strip assembly in the first position and the second strip assembly in the second position, one of the plurality of first vane members adjoins one of the plurality of third vane members.

An example of a thrust reverser cascade includes a strip assembly which includes a strong back member which further includes a plurality of first vane members which extend from a first side of the strong back member. Also included is a second strip assembly which includes a second strong back member which includes a plurality of third vane members which extend from a second side of the second strong back member. The strip assembly is secured at opposing end portions of the strip assembly to a nacelle and the second strip assembly is secured at opposing end portions of the second strip assembly to the nacelle. With each of the strip assembly and the second strip assembly secured to the nacelle, a distal end of one of the first vane members adjoins a distal end of one of the third vane members.

An example of a method for manufacturing a cascade for a thrust reverser for a jet engine which includes forming a vane strip assembly, wherein the vane strip assembly includes a vane member comprising a length; and a plurality of first strong back members which extend from a first side of the vane member in a first direction nonparallel relative to the length of the vane member wherein the plurality of the first strong back members are spaced apart from one another along the length of the vane member.

An example of a method for assembling a cascade for a thrust reverser for a jet engine which includes the steps of placing a vane strip assembly into a first position wherein the vane strip assembly includes: a vane member comprising a length; and a plurality of first strong back members which extend from a first side of the vane member in a first direction nonparallel relative to the length of the vane member wherein the first strong back members are spaced apart from one another along the length of the vane member. The method further includes the step of placing a second vane strip assembly into a second position wherein the second vane strip assembly which includes: a second vane member comprising a length; and a plurality of third strong back members which extend from a second side of the second vane member in a third direction nonparallel relative to the length of the second vane member. The plurality of third strong back members are spaced apart from one another along the length of the second vane member; and with the strip assembly in the first position and the second vane strip assembly in the second position, one of the plurality of first strong back members adjoins one of the plurality of third strong back members.

An example includes a reverse thruster cascade which includes a vane strip assembly which includes a vane member comprising a plurality of first strong back members which extend from a first side of the vane member. The reverse thruster cascade further includes a second vane strip assembly including a second vane member comprising a plurality of third strong back members which extend from a second side of the second vane member. The vane strip assembly is secured at opposing end portions of the vane strip assembly to a nacelle. The second vane strip assembly is secured at opposing end portions of the second vane strip assembly to the nacelle such that with each of the vane strip assembly and the second vane assembly secured to the nacelle a distal end of one of the plurality of the first strong back members adjoins a distal end of one of the plurality of the third strong back members.

The features, functions, and advantages that have been discussed can be achieved independently in various embodiments or may be combined in yet other embodiments further details of which can be seen with reference to the following description and drawings.

DESCRIPTION

Figure 1:
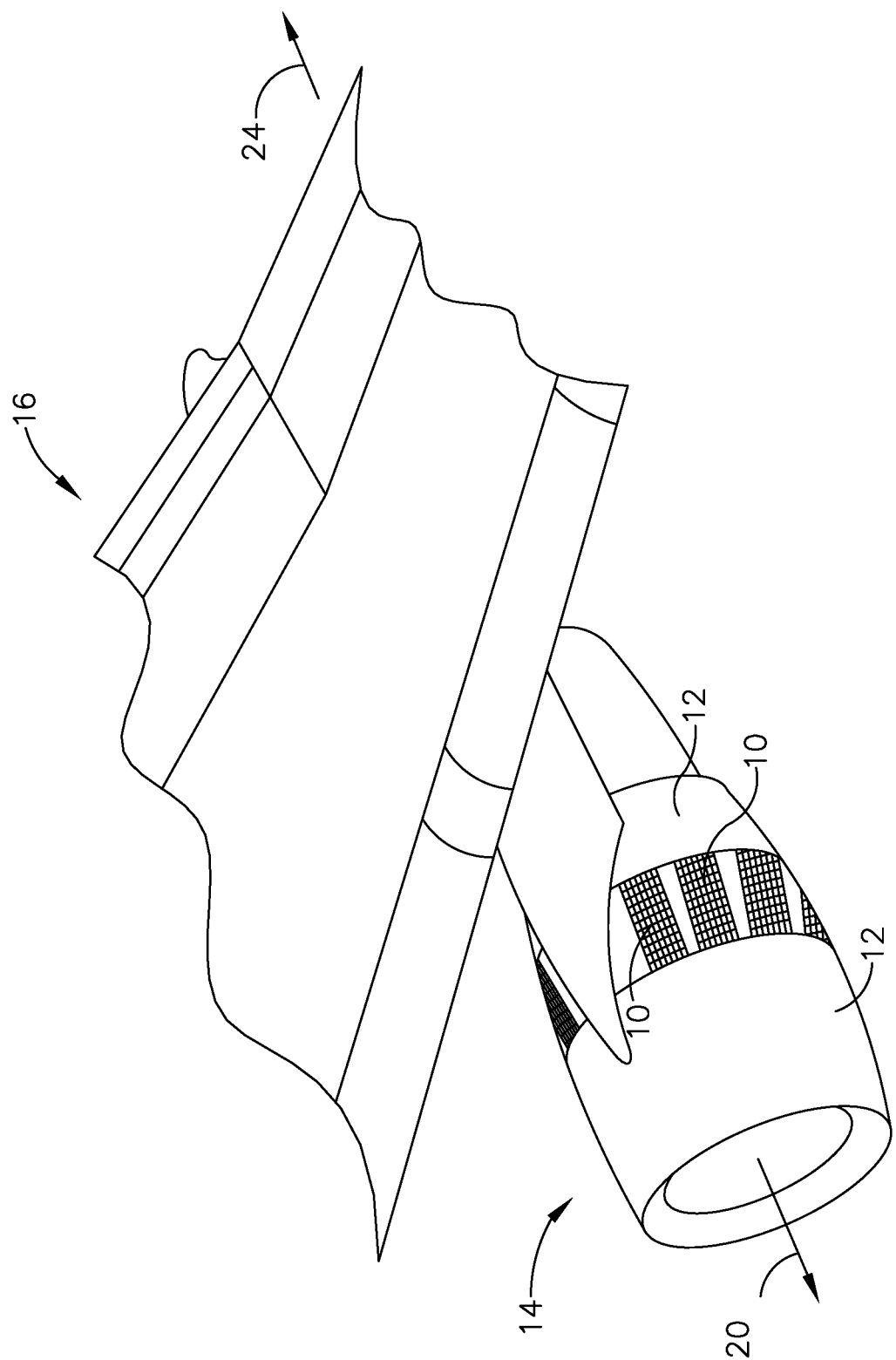
FIG. 1 is a partial perspective view of an aircraft with a jet engine mounted to a wing and with cascades positioned on a nacelle of the jet engine with the thrust reverser of the jet engine in operation.

As discussed above, thrust reversers are devices used to turn jet engine exhaust to a direction with a sufficient forward component to create reverse thrust to enable aerodynamic breaking during an airplane landing maneuver. Cascade 10, as seen in FIG. 1, is a component of a thrust reverser assembly and is mounted to nacelle 12 of a jet engine 14 of aircraft 16. A blocker (not shown) of the thrust reverser assembly directs exhaust air flow from jet engine to and through cascade 10. The configuration of cascade 10 further directs the exhaust air flow which exits cascade 10.

Figure 2:
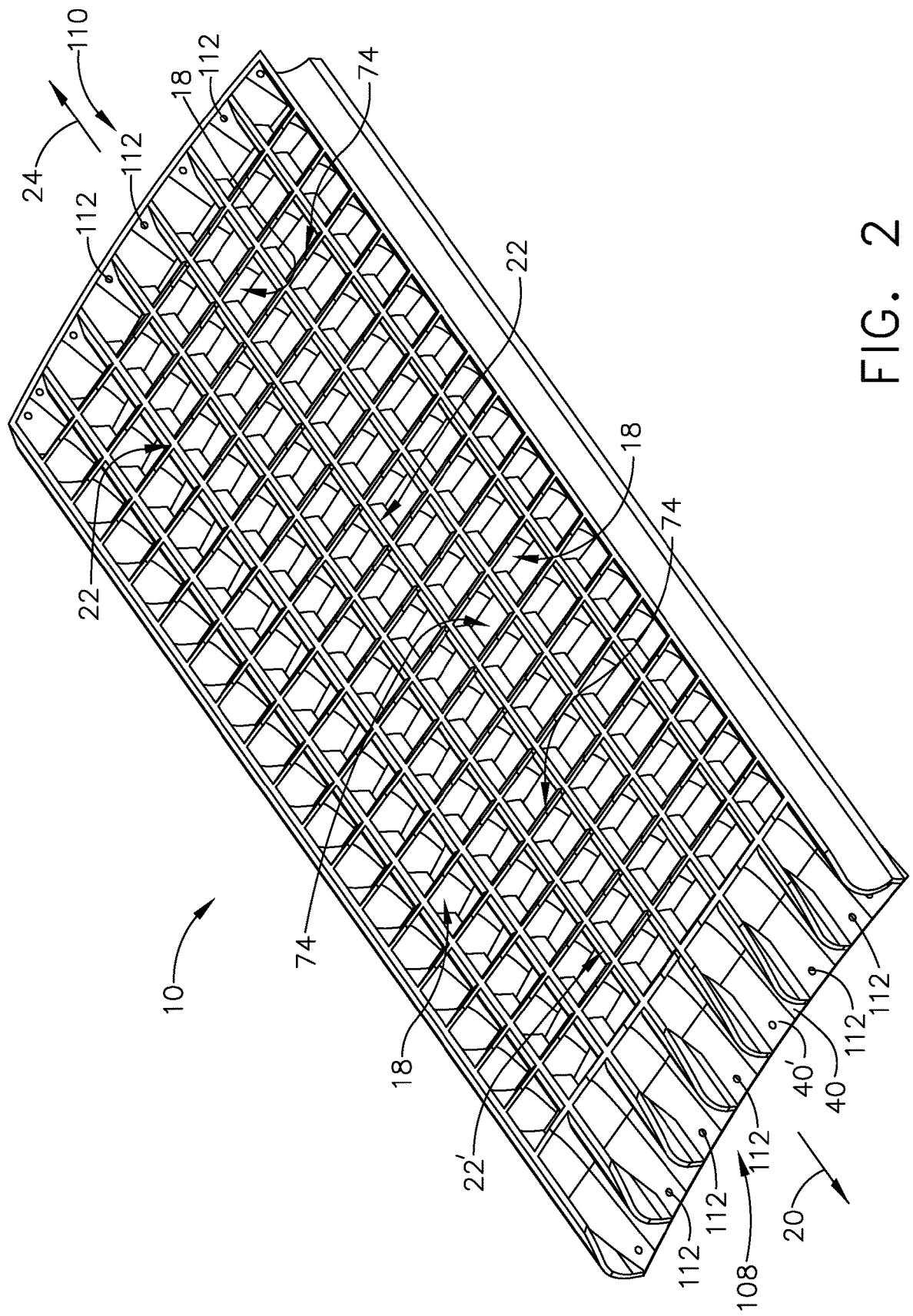
FIG. 2 is a perspective view of an assembled cascade from FIG. 1 showing a first example of a configuration of adjoining distal end portions of vanes of a vane assembly positioned between adjoining strong backs and a first embodiment of a configuration of the vane assembly extending between adjoining strong backs.

Cascades 10, as previously mentioned, include surfaces which will selectively direct the exhaust air flow in a forward and side directions as needed. The direction of the air flow is tailored by the direction of the surfaces of vanes 18, as seen in FIG. 2, within cascade 10 which selectively direct the exhaust air flow in a forward direction 20 of aircraft 16 and strong-back members 22, which extend in forward and aft directions 20, 24 of aircraft 16 which selectively direct the exhaust air flow in a side-turning direction.

A method for manufacturing and assembling cascade 10 for a thrust reverser will be discussed herein, wherein the manufacturing and assembly will be streamlined so as to require less labor, cost and production time. Furthermore, the methodology for manufacturing and assembling of cascade 10 in the present disclosure will be performed without compromising the needed aerodynamic performance of cascade 10 which would otherwise lead to yet additional installation and re-certification costs.

Figure 3:
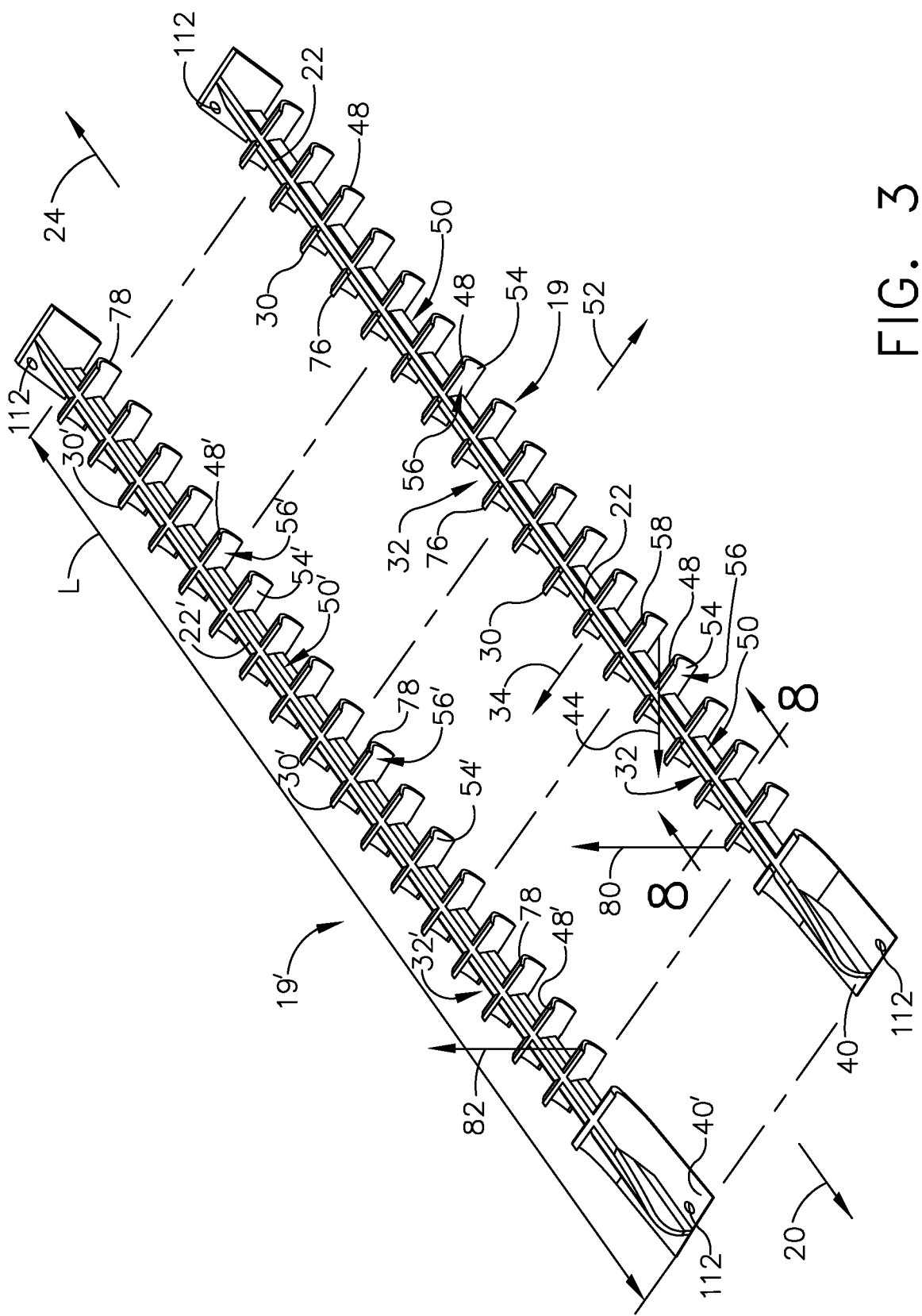
FIG. 3 is a perspective blown apart view of two adjoining cascade strip assemblies from an unassembled cascade of FIG. 2.

There are a variety of methodologies that can be employed to manufacture and assemble cascade 10 which includes methods for forming strip assembly 19, as seen in FIG. 3. These methodologies include for example thermal compressing thermoplastic resin; resin transfer molding; vacuum assisted resin transfer molding process; or other none autoclave processes including printing. In this example, as seen in FIG. 2, eight strip assemblies 19 are assembled together to fabricate cascade 10. Each strip assembly 19 is configured with no more than three sides positioned on one or both sides of strong back member 22 providing a more simplified shape than a four sided shape. This open construction of no more than three sides provides ease in installation, removal and tracking procedures of the strip assemblies 19. Additionally the assembling of strip assemblies 19 into fabricating cascade 10 will permit the fabricator the versatility to provide needed orientation of surfaces with respect to strip assemblies 19 which in turn will not compromise the needed aerodynamic performance of cascade 10.

Figure 4:
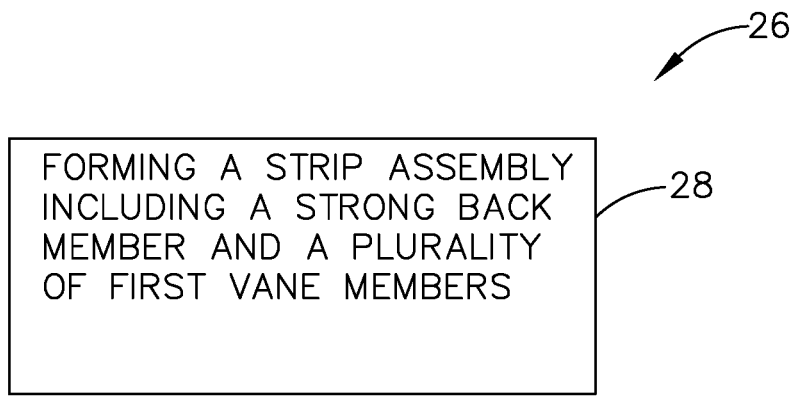
FIG. 4 flow chart of a method for manufacturing a cascade for a thrust reverser for a jet engine.

In referring to FIG. 4, method 26 includes step 28 of manufacturing cascade 10 for a thrust reverser for jet engine 14 which includes forming strip assembly 19 by way of methodologies mentioned above an in this example by way of thermal compressing thermoplastic resin. Strip assembly 19 includes strong back member 22 having length L, as seen in FIG. 3. Strip assembly 19 further includes plurality of first vane members 30 which extend from a first side 32 of the strong back member 22 in first direction 34 non-parallel relative to length L of strong back member 22 wherein first vane members 30 are spaced apart from one another along length L of strong back member 22.

Figure 5:
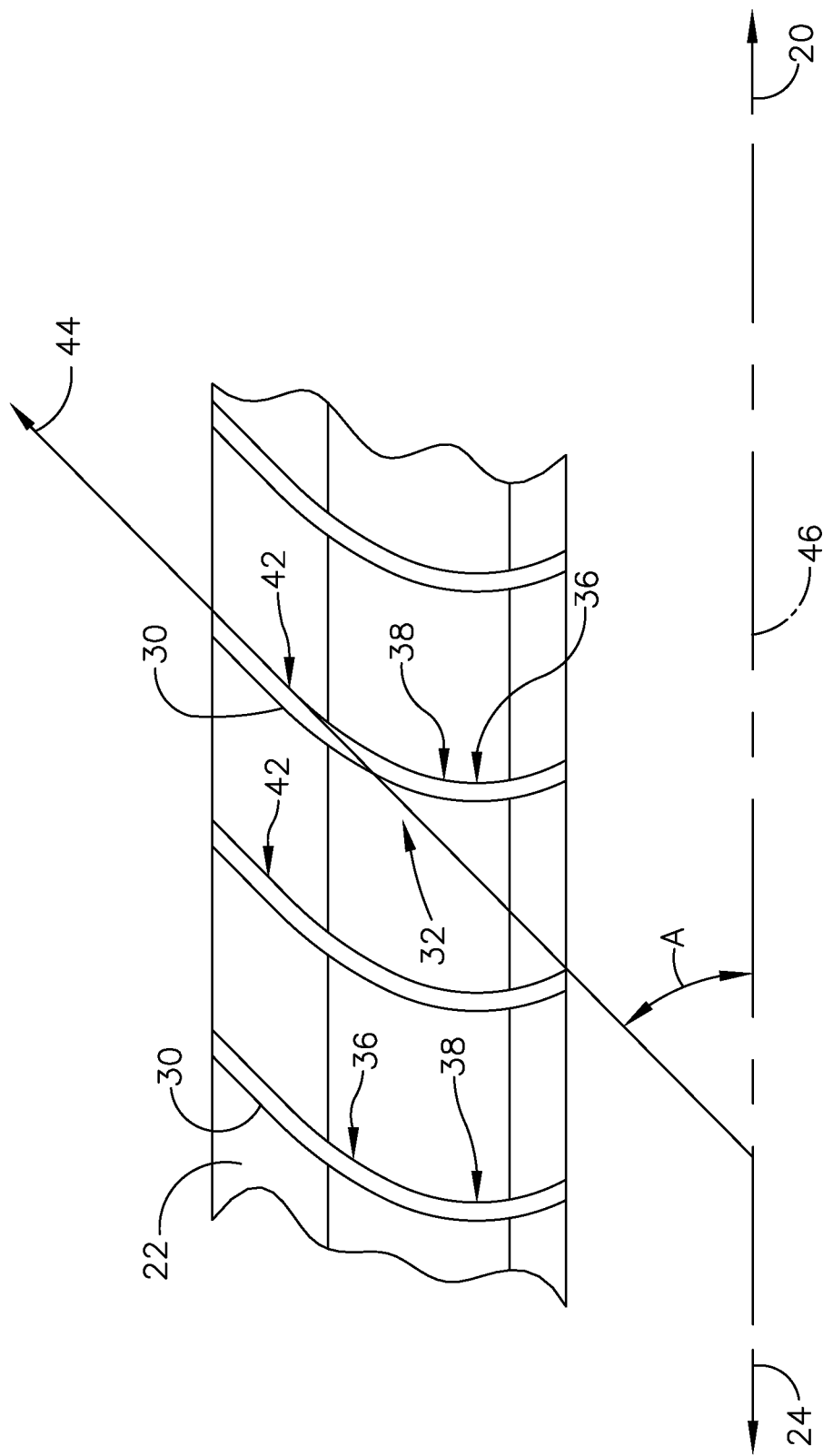
FIG. 5 is an enlarged partial side elevation view of a cascade strip assembly of FIG. 3 showing a central axis of the jet engine to which the cascade is associated.

Plurality of first vane members 30 includes curvilinear surface 36, as seen in FIG. 5. Curvilinear surface 36 forms recess 38 facing forward direction 20 with respect to aircraft 16, as seen in FIG. 3, of strip assembly 19. Step 28 of manufacturing cascade 10 further includes top portion 42 of curvilinear surface 36 extends in surface direction 44 nonparallel relative to central axis 46 of jet engine 14. With strip assembly 19 positioned on nacelle 12, as seen in FIG. 1, of jet engine 14, surface direction 44 forms angle A relative to central axis 46 of jet engine 14 in a range including thirty degrees up to and including ninety degrees. Exhaust air flow of engine 14 is selectively directed in forward direction 20 of aircraft 16 providing braking for aircraft 16 in a landing maneuver.

Figure 6:
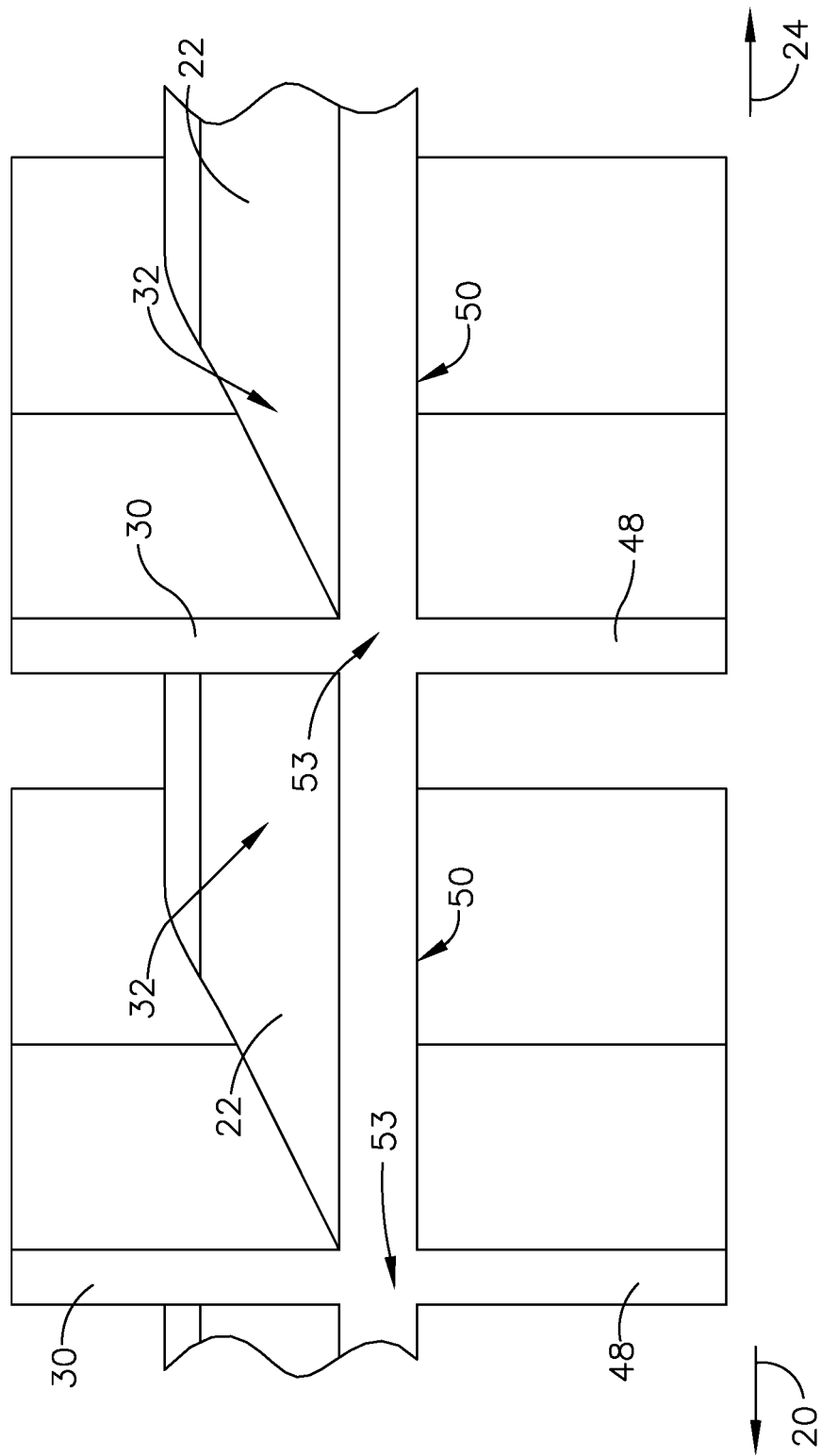
FIG. 6. is a partial top perspective enlarged view of the juncture between a strong back member and first vane members and second vane members, of FIG. 3, wherein an example of a configuration of the first vane member and the second vane member extend from the strong back member in alignment with one another is shown.

Method 26 further includes plurality of second vane members 48, as seen in FIG. 3. Second vane members 48 which extend from second side 50 of the strong back member 22, opposing first side 30 of strong back member 22, in second direction 52 nonparallel relative to length L of strong back member 22. The plurality of second vane members 48 are spaced apart from one another along length L of strong back member 22, as seen in FIG. 3. As seen in FIG. 6, one first vane member 30 of the plurality of first vane members 30 and one second vane member 48 of plurality of second vane members 48 extend in alignment with one another which contribute to providing first embodiment configuration of vane assembly 74 as seen in FIG. 2 and which will be further discussed herein. With utilizing one of the methodologies as mentioned above such as thermal compressing of a thermoplastic resin, juncture 53 of strong back member 22, first vane member 30 and second vane member 48 is a continuous structure providing a desired strengthened interconnection of strong back member 22 with first and second vane members 30, 48.

As seen in FIGS. 3 and 6 each of plurality of first vane members 30 is positioned to extend from the strong back member 22 in alignment with one second vane member 48 of plurality of the second vane members 48. This structure arrangement provides a three sided configuration positioned on either side of strong back member 22 with spaced apart first vane members 30 and first side 32 of strong back 22 on one side of strong back member 22 and second vane members 48 spaced apart on second side 50 of strong back member 22. This simplified open configuration for strip assembly 19 provides for less complicated molding steps, less labor efforts along with no compromise in aerodynamic surfaces so as to precipitate a need for recertification.

Figure 7:
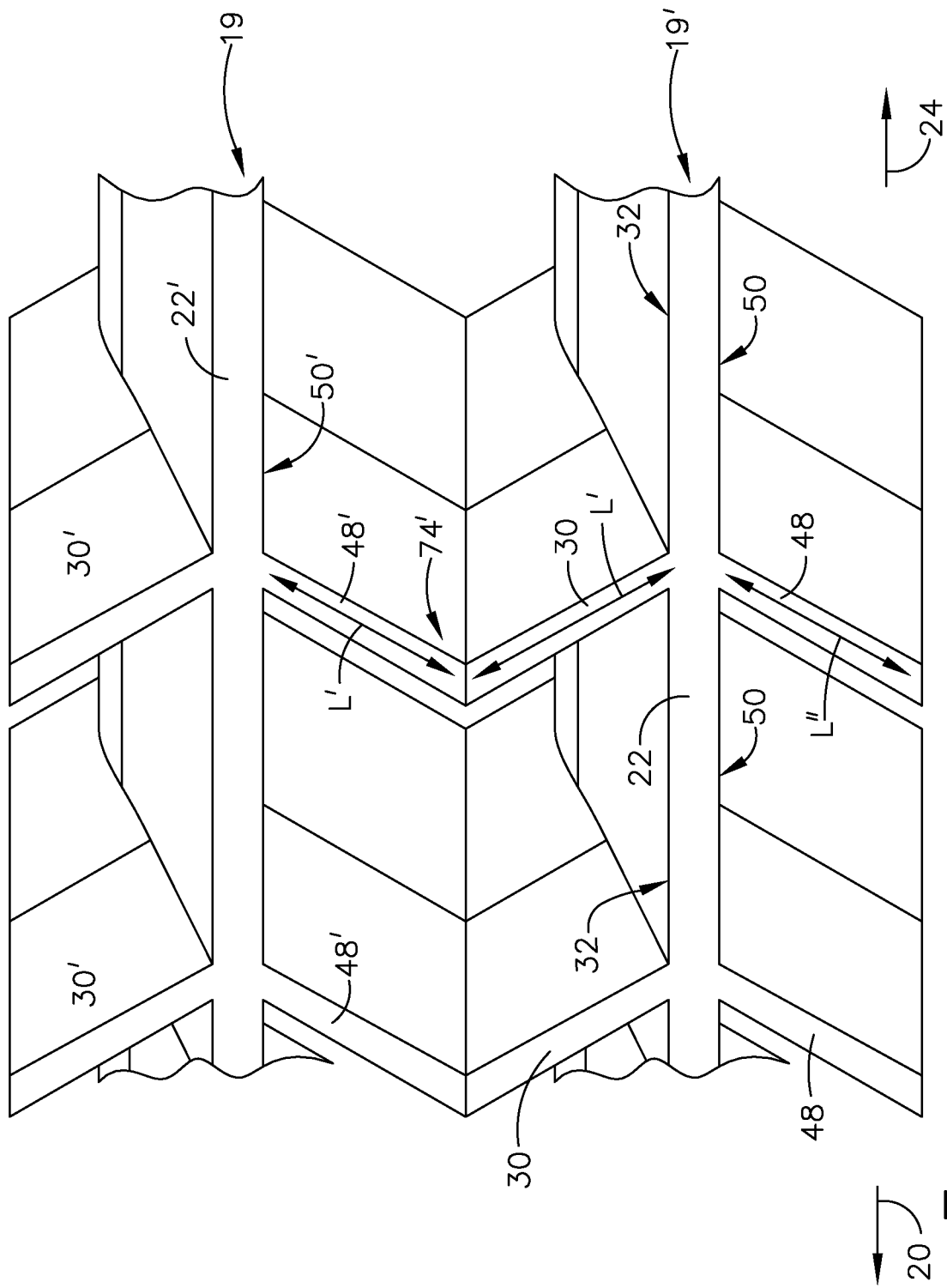
FIG. 7 is a partial enlarged top elevation view of a second embodiment of a configuration of the first vane member and the second vane member extend from the strong back member positioned in angular relationship to one another.

As seen in FIGS. 3 and 6, an example of a configuration of first vane member 30 and second vane member 48 are seen in which first vane member 30 extends from strong back member 22 in alignment with one second vane member 48. A second example of a configuration of first vane member 30 and second vane member 48 is seen in FIG. 7 wherein a length L' of one of the plurality of first vane member 30 and length L" of one of the plurality of second vane member 48 are positioned in angular relationship to one another. This configuration will provide additional support for cascade 10 with respect to exhaust air flow of engine 14 being diverted through cascade 10 as will be discussed further herein with the assembling of cascade 10. This configuration will provide the ability to assemble second embodiment of the angular arrangement of vane assembly 74' which will be discussed herein.

At least one second vane members 48 is similar in construction in this example to first vane members 30, as seen in FIG. 3. At least one second vane member 48 includes curvilinear surface 54 which forms recess 56 and which faces forward direction 20 of aircraft 16. Top portion 58 of curvilinear surface 54 of second vane members 48 extends in surface direction 44 as shown in FIG. 3. This configuration is similar to that shown in FIGS. 3 and 5 for first vane members 30. Surface direction 44 for second vane members 48 is nonparallel to central axis 46 of jet engine 14 (not shown) as is surface direction 44 of first vane members 30 such that, with the strip assembly 19 positioned on nacelle 12 of jet engine 14, surface direction 44 for second vane members 48 form an angle relative to central axis 46 of jet engine 14 in a range including thirty degrees up to and including ninety degrees, similarly as described above and as shown for first vane member 30 in FIG. 5.

Figure 8:
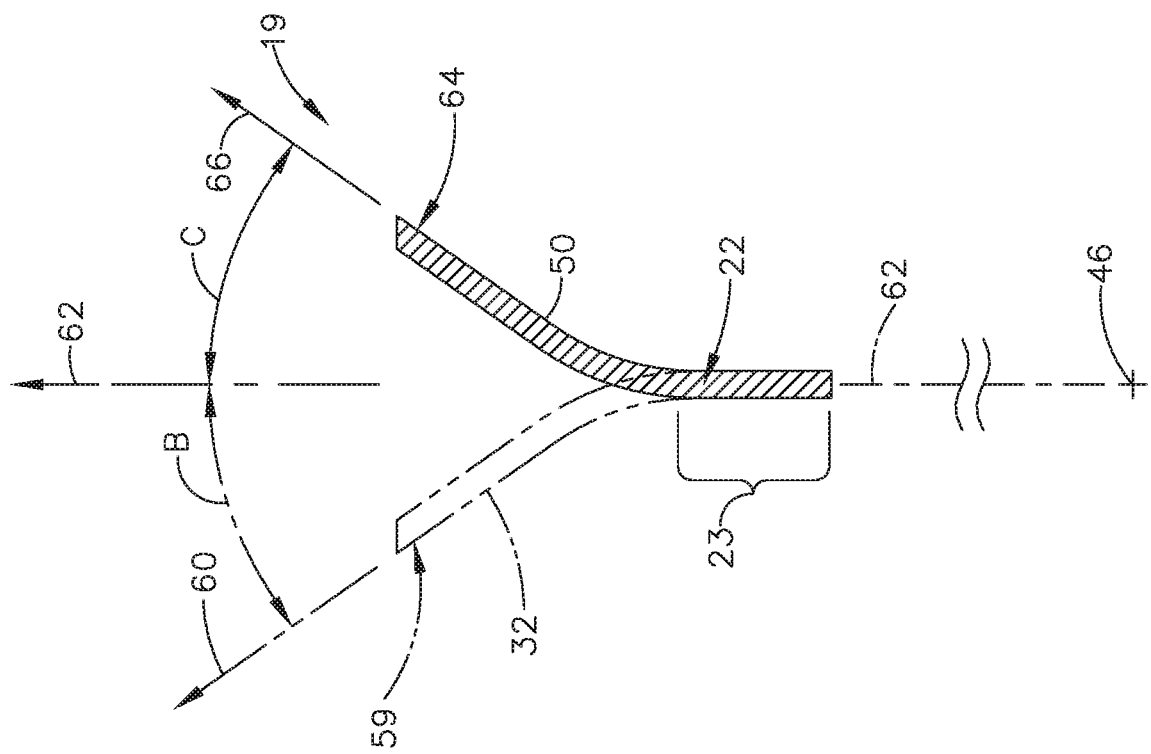
FIG. 8 is a cross section view along line 8-8 of a strong back of a strip assembly of a cascade as seen in FIG. 3 showing examples of angular variations of strong back configurations relative to a radial direction extending from a central axis of the jet engine.

Step 28 further includes strong back member 22, also referred to as first strong back member 22, including first side surface 32 which extends along length L of strong back member 22 and extends transverse to length L of strong back member 22. Also included is second side surface 50 of strong back member 22 opposing first side 32, wherein second side surface 50 also extends along length L of strong back member 22 and extends transverse to length L of strong back member 22, as seen in FIG. 3. As seen in FIG. 8, first side surface 32 of the strong back member 22 has top portion 59 such that, with strip assembly 19 positioned on nacelle 12 of jet engine 14, as seen in FIG. 1, top portion 59 of first side surface 32 extends in third direction 60 relative to radial direction 62 which extends from central axis 46 of jet engine 14 and aligned with strong back member 22 positioned closer to central axis 46 of jet engine 14 than top portion 59 of first side 32 of strong back member 22. Third direction 60 extends relative to radial direction 62 within an angular range including extending parallel with radial direction 62 and up to and including being angularly displaced sixty degrees from radial direction 62 as indicated for example by angle B.

Second side 50 opposing first side 32 of strong back member 22 extends along length L of strong back member 22 and extends transverse to length L of strong back member 22. Second side 50 of strong back member 22 has top portion 64 such that, with strip assembly 19 positioned on nacelle 12 of jet engine 14, top portion 64 of second side surface 50 extends in fourth direction 66 relative to radial direction 62 which extends from central axis 46 of jet engine 14 and aligned with strong back member 22 positioned closer to central axis 46 of jet engine 14 than top portion 64 of second side 50 of strong back member 22. Fourth direction 66 extends relative to radial direction 62 within an angular range including extending parallel with radial direction 62 and up to and including being angularly displaced sixty degrees from radial direction 62, as seen for example as angle C in FIG. 8. This variable configuration for first surface 32 and second surface 50 of strong back member 22 provides the fabricator the ability to manufacture cascade 10 to provide a selected directed side turning of exhaust air flow from jet engine 14, depending on the position of a particular cascade 10 is located on nacelle 12, so as direct exhaust air flow away from aircraft parts as needed.

Figure 9:
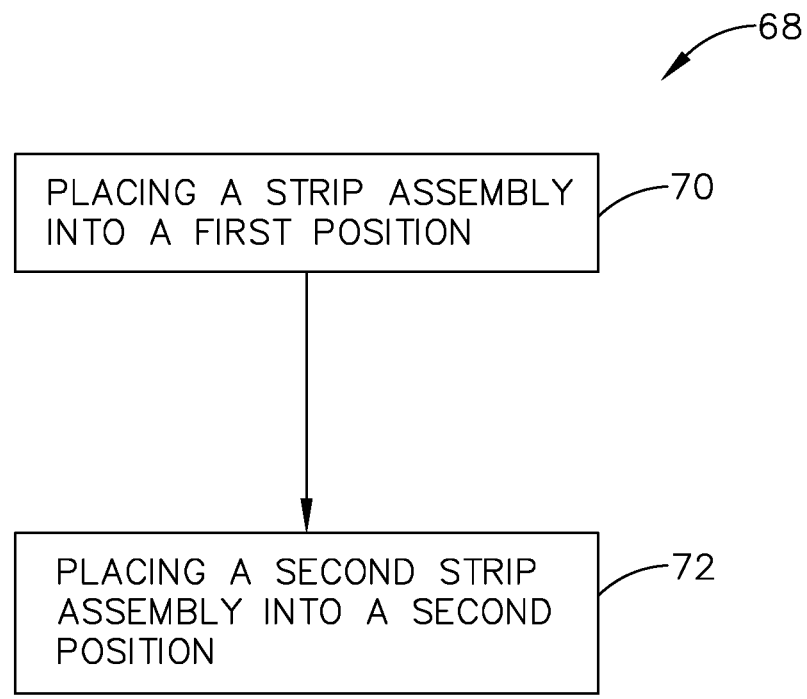
FIG. 9 is a flow chart of a method for assembling a cascade for a thrust reverser for a jet engine.

In referring to FIG. 9, method 68 of assembling cascade 10 for a thrust reverser for jet engine 14 includes step 70 of placing strip assembly 19 into a first position, as seen in FIG. 3, wherein first strip assembly or also referred to as strip assembly 19 includes strong back member or also referred to as first strong back member 22 having length L, as earlier described. Strip assembly 19 further includes plurality of first vane members 30 which extend from first side 32 of strong back member 22 in first direction 34 nonparallel relative to length L of strong back member 22, as seen in FIG. 3. First vane members 30 are spaced apart from one another along length L of strong back member 22. Method 68 further includes step 72 of placing second strip assembly 19' into a second position, as seen in FIG. 3, wherein second strip assembly 19' includes second strong back member 22' including length L. It is to be noted FIG. 3 is an exploded or separated view of strip assembly 19 and second strip assembly 19'. The first position of strip assembly 19 is a position wherein with second strip assembly 19' positioned in the second position, strip assembly 19 and second strip assembly 19' are positioned alongside and against one another. It should be noted the numbering of parts with respect to strip assembly 19 and second strip assembly 19' will have the same number designations with a ("'") added to those elements associated with second strip assembly 19'. Second strip assembly 19' further includes plurality of second vane members 48' which extend from second side 50' of second strong back member 22' in a second direction 52, in this example, nonparallel relative to length L of second strong back member 22. Plurality of second vane members 48' are spaced apart from one another along length L of second strong back member 22. With strip assembly 19 in first position and second strip assembly 19' in second position, one of the plurality of first vane members 30 adjoins one of the plurality of second vane members 48' which form vane assembly 74 as seen for example in FIG. 2.

In referring to FIG. 3, method 68 of assembling further includes distal end 76 of one of the plurality of first vane members 30 relative to first side 32 of the strong back member 22 and distal end 78 of one of plurality of second vane members 48' relative to second side 50' of second strong back member 22' adjoin one another in forming vane assembly 74 as seen in FIG. 3 with utilizing various configurations as will be described herein.

Figure 10:
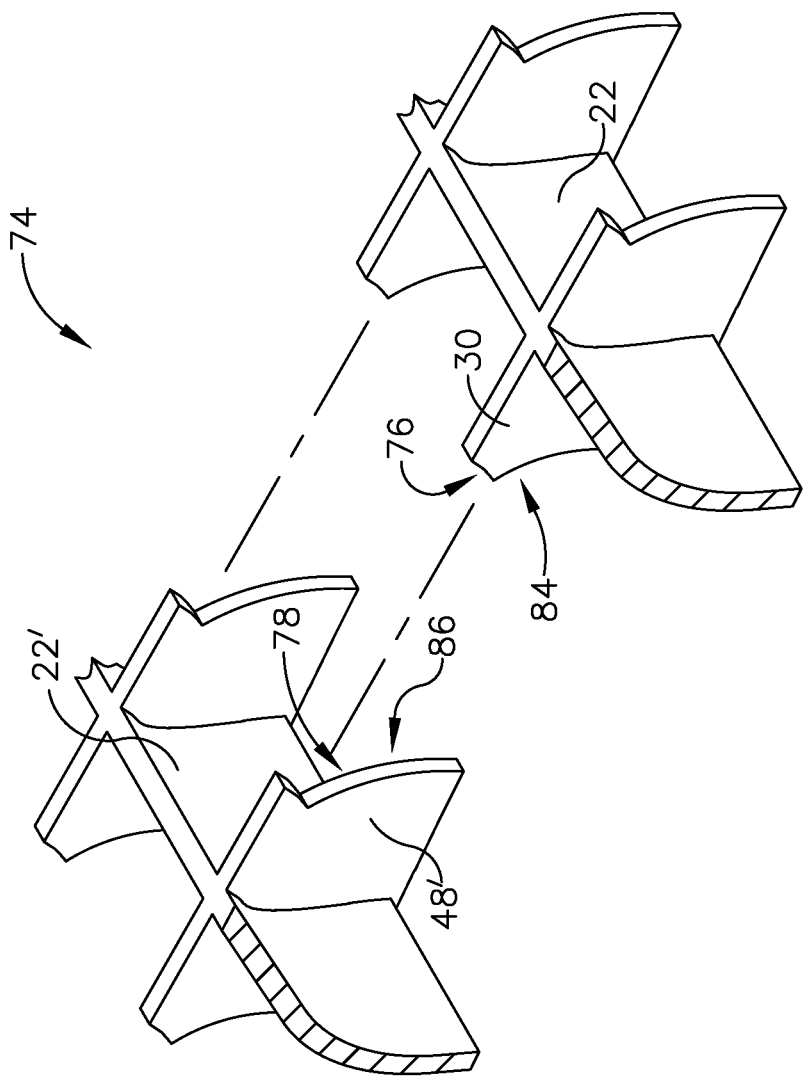
FIG. 10 is a partial perspective blown apart view of two adjoining strip assemblies of an assembled cascade showing a second example of a configuration of adjoining distal end portions of vanes of the vane assembly positioned between adjoining strong backs.

A first example of the various configurations that can be employed to distal end 76 and distal end 78 includes distal end 76 of first vane member 30 extends along first plane 80, as seen in FIG. 3 and distal end 78 of second vane member 48' extends along second plane 82 wherein first plane 80 and second plane 82 extend in the same direction. In this example, first vane member 30 and second vane member 48' are adjoined with respect to one another into vane assembly 74. A second configuration is shown for example in FIG. 10. Distal end 76 of first vane member 30 of one of plurality of first vane members 30 defines an angularly shaped configuration 84 and distal end 78 of second vane member 48' of one of plurality of second vane members 48' defines a complementary shape 86 relative to angularly shaped configuration 84. In this example, angularly shaped configuration 84 fits into complementary shape 86 with first vane member 30 and second vane member 48' adjoined with respect to one another into vane assembly 74. In this second example, the configurations for first vane member 30 and for second vane member 48' can be exchanged such that first vane member includes complementary configuration 86 and second vane member 48' includes configuration 84. A third configuration is shown for example in FIG. 11. Distal end 76 of first vane member 30 of one of plurality of first vane members 30 defines protrusion 88 and distal end 78 of third second vane member 48' of plurality of second vane members 48' defines notch 90. Protrusion 88 and notch 90 are complementary in shape to one another interlocking one of plurality of first vane member 30 and one of the plurality of second vane member 48'. In this third example, the configurations for first vane member 30 and for second vane member 48' can be exchanged such that first vane member includes notch 90 and second vane member 48' includes protrusion 88.

Method 68 of assembling of cascade 10 further includes one of the plurality of first vane members 30, as seen in FIG. 7 extends away from first side 32 of strong back member 22 toward second strong back member 22'. One of plurality of second vane members 48' extends away from second side 50' of second strong back member 22' toward strong back member 22 positioning one of the plurality of the first vane members 30 and one of the plurality of second vane members 48' in angular relationship to one another. This adjoining configuration provides a strong resistant vane assembly 74 with this angular configuration receiving exhaust air flow moving toward aft direction 24 from jet engine 14 with the thrust reverser in operation.

Method 68 further includes strong back member 22 including front portion 40 which extends from first side 32 of strong back member 22. Second strong back member 22' includes a second front portion 40' which extends from second side 50' of second strong back member 22' as seen for example in FIGS. 3 and 12. With strip assembly 19 in the first position and second strip assembly 19' in the second position front portion 40 of strong back member 22 adjoins second front portion 40' of second strong back member 22'.

Figure 12:
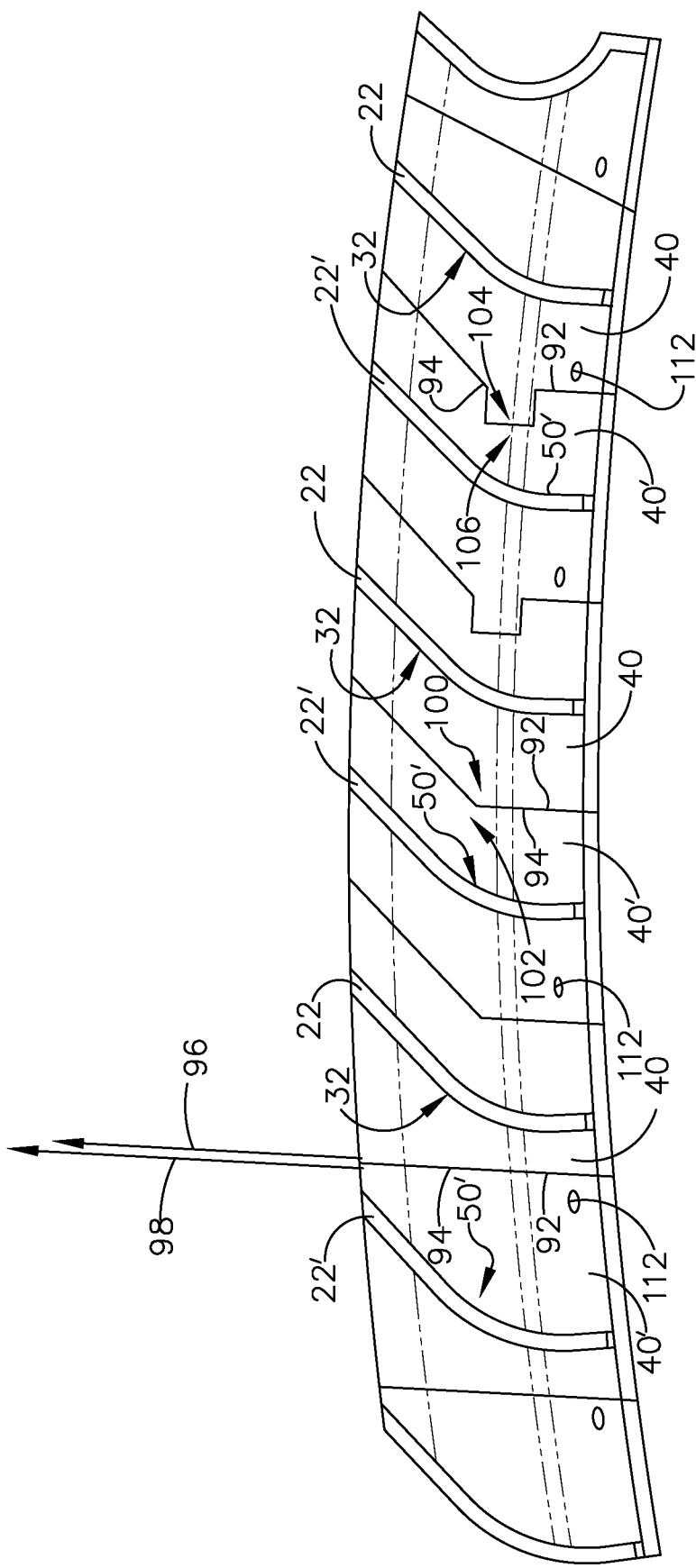
FIG. 12 is a forward end elevation view of the cascade of FIG. 2 showing first, second and third examples of different forward end configurations of adjoining front portions of the cascade.

In referring to FIG. 12, example configurations are shown of adjoining front portion 40 and second front portion 40'. Cascade 10 can utilize one or more of these example configurations of adjoining front portion 40 and second front portion 40' that are shown in FIG. 12. With front portion 40 and second front portion 40' adjoined, distal end 92 of front portion 40 of strong back member 22 and distal end 94 of second front portion 40' of second strong back member 22' adjoin one another in one of several configurations discussed herein.

In one example, distal end 92 of the front portion 40 of strong back member 22 extends in a first plane 96 (generally represented by arrow 96) and distal end 94 of second front portion 40' of second strong back member 22' extends in second plane 98 (generally represented by arrow 98) wherein first plane 96 and second plane 98 extend in the same direction. In a second example, one of distal end 92 of front portion 40 of strong back member 22 or distal end 94 of second front portion 40' of second strong back member 22' defines an angularly shaped configuration 100. In the example shown in FIG. 12, distal end 92 has angularly shaped configuration 100. The other of distal end 92 of front portion 40 of strong back member 22 or distal end 94 of second front portion 40' of second strong back member 22' defines a complementary shape 102 to the angularly shaped configuration 100. In the example shown in FIG. 12, distal end 94 has complementary shape 102. In a third example, distal end 92 of front portion 40 of one of front portion 40 of strong back member 22 or distal end 94 of second front portion 40' of second strong member 22' defines protrusion 104. In the example shown in FIG. 12, distal end 92 of front portion 40 defines protrusion 104. The other of distal end 92 of front portion 40 of strong back member 22 or second front portion 40' of second strong back member 22' defines notch 106. In the example shown in FIG. 12, distal end 94 of second front portion 40' defines notch 106. Protrusion 104 and notch 106 are complementary in shape to one another interlocking front portion 40 of strong back member 22 and second front portion 40' of second strong back member 22'.

Vane assemblies 74 which include for example first vane member 30 and second vane member 48' in cascade 10 and front portions including front portion 40 and second front portion 40' can be secured to secured to one another in the assembling of cascade 10. A variety of securements can be used employing methodologies such as patch bonding, glue bonding, welding or applying rivets or other types of fasteners. In other instances, as will be described below, cascade 10 can be assembled onto nacelle 12 with securement of each strip assembly at the opposing ends of the strip assemblies to nacelle 12.

Cascade 10 as described above includes strip assembly 19, which further includes first strong back member 22 having plurality of first vane members 30 which extend from first side 32 of first strong back member 22 as seen in FIG. 3. Cascade 10 further includes second strip assembly 19', as seen in FIG. 3, which also includes second strong back member 22' which further includes plurality of second vane members 48' which extend from second side 50' of second strong back member 22'. Strip assembly 19, as seen in FIGS. 2 and 3, is secured in this example at opposing end portions 108, 110 of strip assembly 19 to nacelle 12 with rivets 112 as shown schematically in FIG. 2. Second strip assembly 19' is secured at opposing end portions 108, 110 of second strip assembly 19' to nacelle 12 such that, with each of strip assembly 19 and second strip assembly 19' secured to nacelle 12, distal end 76 of one first vane member 30 of the plurality of first vane members 30 adjoins distal end 78 of one second vane member 48' of the plurality of second vane members 48'.

At least one first vane member 30 of plurality of first vane members 30 and at least one second vane member 48' of plurality of second vane members 48' include curvilinear surface 36 and 54' respectively, as seen in FIGS. 3 and 5. The curvilinear surfaces, in this example, form recess 38 with respect to first vane members 30 and recess 56' with respect to second vane members 48' which face in forward direction 20 with respect to aircraft 16. In this example, top portion 42 of first vane member 30 and top portion 58' of second vane member 48' of the curvilinear surfaces 36 and 54' respectively, extend in a surface direction 44 nonparallel relative to central axis 46 of jet engine 14. As seen for example in FIG. 5 for first vane member 30, which is similar to that of second vane member 48' (not shown), with strip assembly 19 positioned on nacelle 12 of jet engine 14, surface direction 44 forms an angle A relative to central axis 46 of jet engine 14 in a range including thirty degrees up to and including ninety degrees. This angular range provides the fabricator with the versatility of directing exhaust air flow from first vane member 30 and second vane member 48' into selected needed directions.

As discussed earlier, at least one first vane member 30 of the plurality of first vane members 30 and at least one second vane member 48' of the plurality of second vane members 48', as seen in FIG. 3, extend in alignment with one another forming vane assembly 74, as seen in FIG. 2, vane assembly 74 is positioned between strip assembly 19 and second strip assembly 19'. A second embodiment of the formation of vane assembly 74, as seen in FIG. 7, is shown as vane assembly 74' which includes length L' of at least one first vane member 30 of the plurality of first vane members 30 and length L" of at least one second vane member 48' of the plurality of second vane members 48' are positioned in angular relationship to one another forming second vane assembly 74' between strip assembly 19 and second strip assembly 19'.

Cascade 10 includes strong back member 22, as seen in FIGS. 3 and 8, which includes first side 32 and second side 50 opposing first side 32. First side 32 extends along length L of first strong back member 22 and extends transverse to length L of first strong back member 22 and second side 50 extends along length L of first strong back member 22 and extends transverse to length L of first strong back member 22. First side 32 of first strong back member 22 has top portion 59 such that with strip assembly 19 positioned on nacelle 12 of jet engine 14, top portion 59 of first side 32 extends in third direction 60 relative to radial direction 62 which extends from central axis 46 of jet engine 14 and aligned with first strong back member 22 positioned closer to central axis 46 of jet engine 14 than top portion 59 of first side 32 of first strong back member 22. Third direction 60 is angularly positioned with respect to radial direction 62 in an angular directional range from and including extending parallel with the radial direction 62 and up to and to include being angularly displaced sixty degrees from parallel with radial direction 62. Similarly, second side 50 of first strong back member 22 has top portion 64 such that with strip assembly 19 positioned on nacelle 12 of jet engine 14 top portion 64 of second side 50 extends in fourth direction 66 relative to radial direction 62 which extends from central axis 46 of jet engine 14 and aligned with first strong back member 22 positioned closer to central axis 46 of jet engine 14 than top portion 59 of second side 50 of first strong back member 22. Fourth direction 66 is angularly positioned with respect to radial direction 62 in a directional range from and including extending parallel to the radial direction 62 and up to sixty degrees angularly displaced from parallel with radial direction 62.

Figure 11:
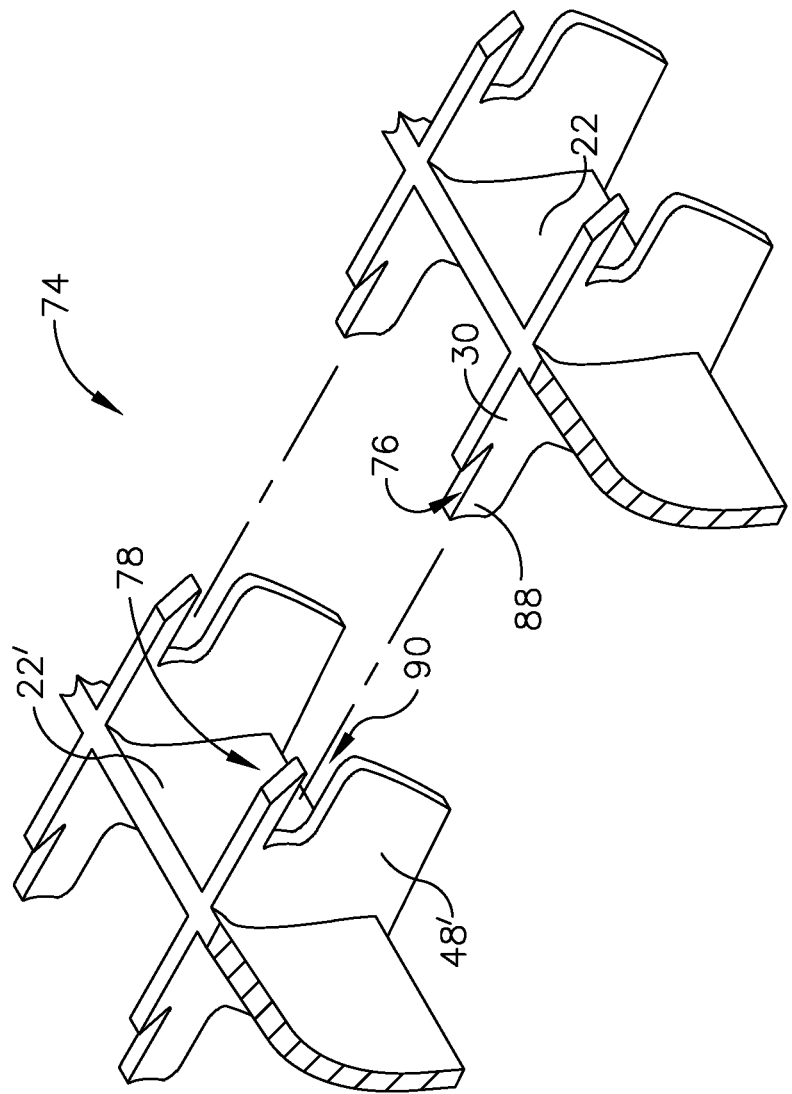
FIG. 11 is a partial perspective blown apart view of two adjoining strip assemblies from an assembled cascade showing a third example of a configuration of adjoining distal end portions of vanes of the vane assembly positioned between adjoining strong backs.

Cascade 10 further includes at least one first vane member 30 of the plurality of the first vane members 30 include a distal end 76 relative to first strong back member 22. Cascade 10 further includes at least one second vane member 48' of the plurality of second vane members 48' which includes distal end 78 relative to second strong back member 22'. Distal end 76 of first vane members 30 adjoin distal end 78 of third second vane members 48' in one of the several configurations described herein. In one configuration example, distal end 76 of at least one first vane member 30 of the plurality of first vane members 30 extends along in first plane 96 and distal end 78 of one second vane member 48' of the plurality of the second vane members 48' extends along in second plane 98, wherein first plane 96 and second plane 98 extend in the same direction. In a second configuration example, distal end 76 of one first vane member 30 of the plurality of first vane members 30 or distal end 78 of one second vane member 48' of the plurality of second vane members 48' defines an angularly shaped configuration 84 and distal end 78 of the other of one first vane member 30 of the plurality of first vane members 30 or of one second vane member 48' of the plurality of second vane members 48' defines complementary shape 86 relative to angularly shaped configuration 84. As shown in an example in FIG. 10, distal end 76 defines angularly shaped configuration 84 and distal end 78 defines complementary shape 86. In a third configuration example, as seen in FIG. 11, distal end 76 of one first vane member 30 of the plurality of first vane members 30 or distal end 78 of one second vane member 48' of the plurality of the second vane members 48', defines protrusion 88. Distal end 76 of the other of one first vane member 30 of the plurality of first vane members 30 or of the one second vane member 48' of the plurality of the second vane members 48' defines notch 90. Protrusion 88 and notch 90 are complementary in shape to one another interlocking one first vane member 30 of the plurality of the first vane members 30 and one second vane member 48' of the plurality of the second vane members 48'.

Figure 13:
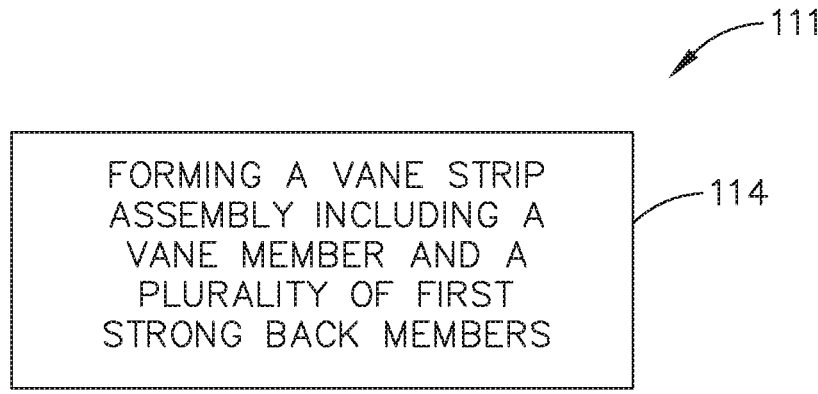
FIG. 13 is a flow chart of another method for manufacturing a thrust reverser for a jet engine.
Figure 14:
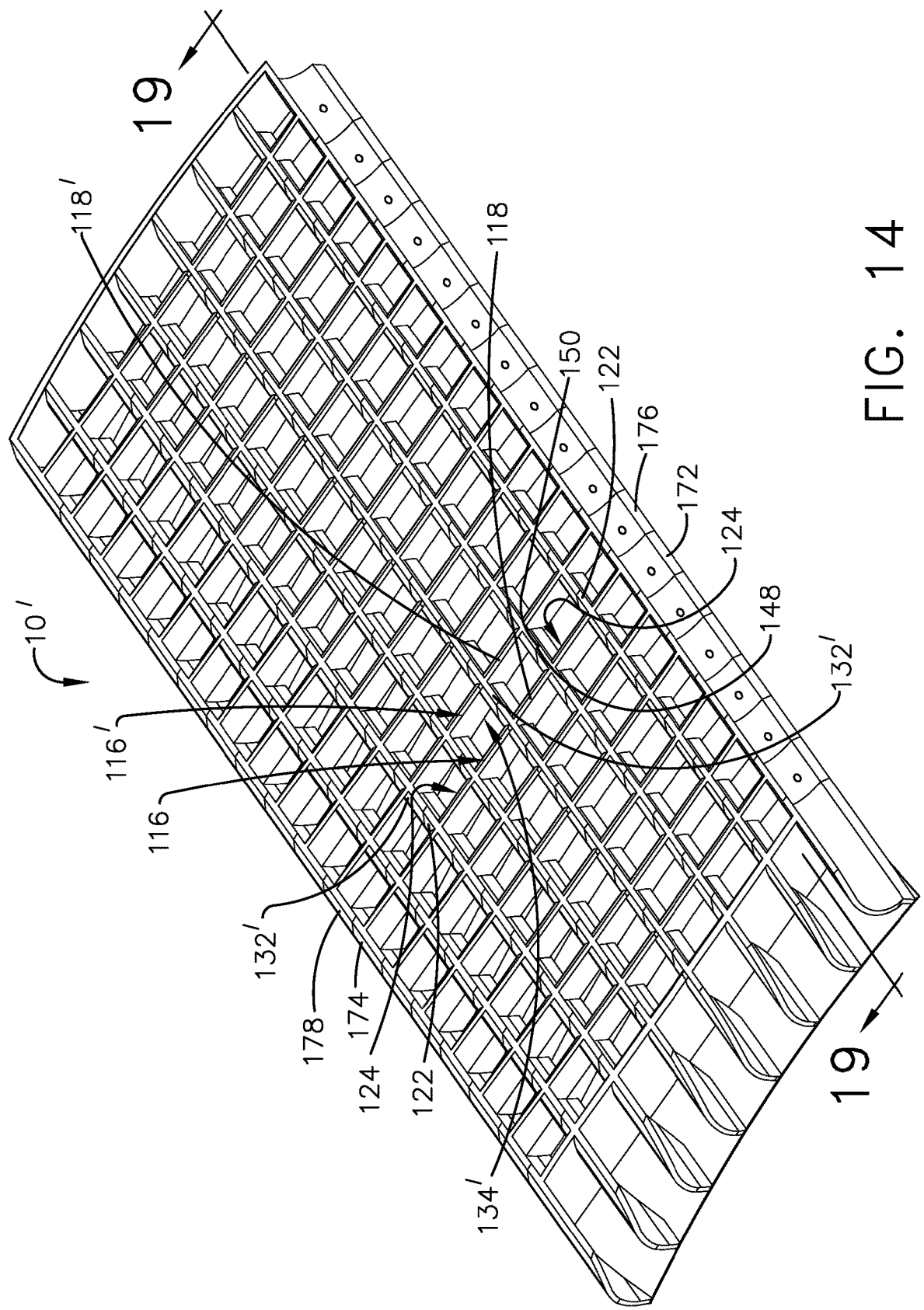
FIG. 14 is a perspective view of an assembled cascade from FIG. 1 showing a first example of a configuration of adjoining distal end portions of strong back members of adjoining vane strip assemblies.
Figure 15:
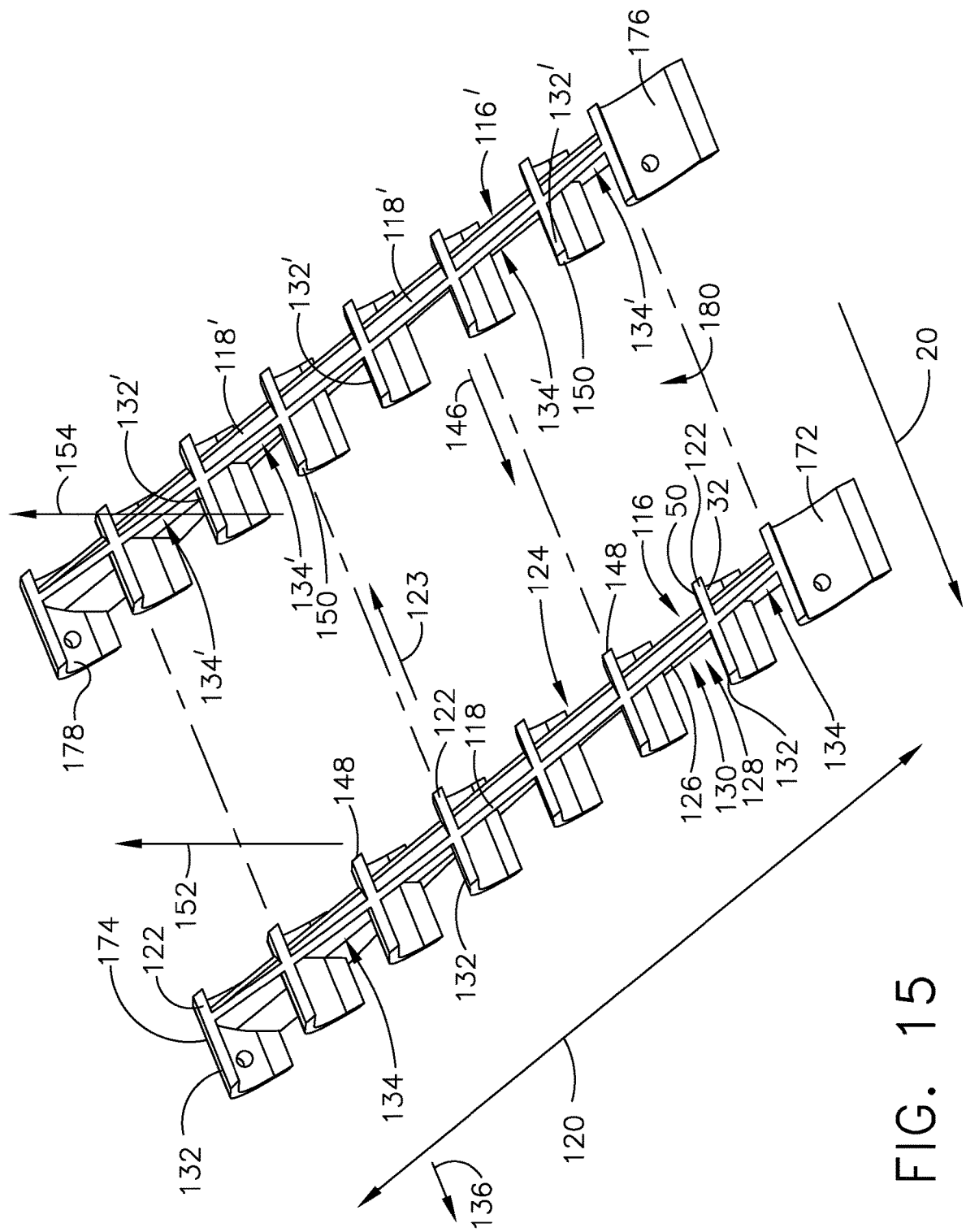
FIG. 15 is a perspective blown apart view of two adjoining vane strip assemblies from an unassembled cascade of FIG. 13.

Now in referring to FIGS. 13-15, another method 111 for manufacturing another example of cascade 10', for a thrust reverser for a jet engine 14 includes the step of forming 114 vane strip assembly 116 which includes vane member 118 which comprises length 120 and a plurality of first strong back members 122 which extend from first side 124 of vane member 118 in first direction 123. First direction 123 is nonparallel relative to length 120 of vane member 118 wherein plurality of the first strong back members 122 are spaced apart from one another along length L of vane member 118.

Figure 19:
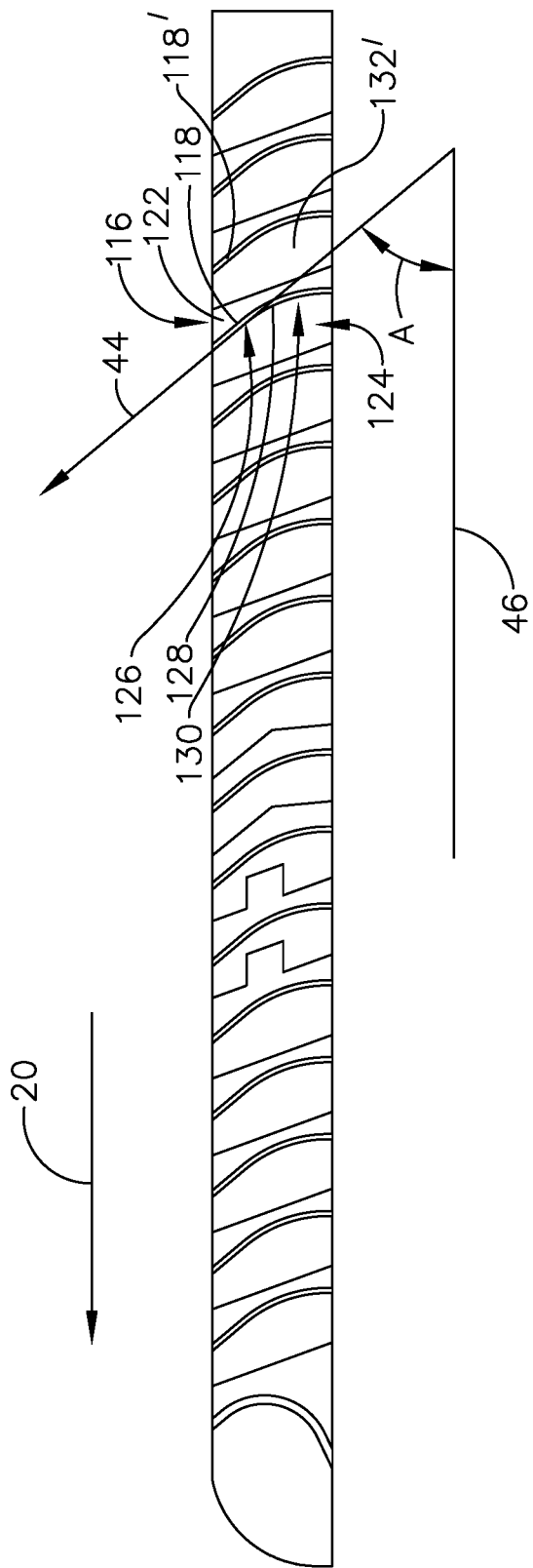
FIG. 19 is a cross section taken along line 19-19 in FIG. 13 showing first, second and third examples of different adjoining configurations of strong back members of adjoining vane strip assemblies.

The step of forming 114 further includes vane member 118, as seen in FIG. 19, including curvilinear surface 128 wherein curvilinear surface 128 forms recess 130 facing forward direction 20. Further included is top portion 126 of curvilinear surface 128 which extends in a surface direction 44 nonparallel relative to central axis 46 of jet engine 14 such that, with vane strip assembly 116 positioned on nacelle 12 of jet engine 14, surface direction 44 forms an angle A relative to central axis 46 of jet engine 14 in a range from and including thirty degrees and up to and to include ninety degrees providing turning jet engine 14 thrust into a direction more aligned in this example with forward direction 20.

Step 114 of forming further includes a plurality of second strong back members 132, as seen in FIG. 15, which extend from second side 134 of vane member 118, opposing first side 124 of vane member 118, in second direction 136 nonparallel relative to length 120 of vane member 118. Plurality of second strong back members 132 are spaced apart from one another along length L of vane member 118. Step 114 of forming further includes one first strong back member 122 of the plurality of first strong back members 122 and one second strong back member 132 of the plurality of second strong back members 132 extend in alignment with one another. As seen in the present example, each of plurality of the first strong back members 122 is positioned to extend from vane member 118 in alignment with one second strong back member 132 of the plurality of the second strong back members 132.

Step 114 of forming of method 111 further includes first strong back member 122 of FIG. 15 can be seen as earlier described and similarly structured strong back member 22 in FIG. 8. The configuration of first strong back member 122 will be described in relationship to FIG. 8 wherein first strong back member 122 will be referred to and shown as strong back member 22, in FIG. 8. Strong back 22 includes first side 32 and second side 50 opposing first side 32. First side 50 of the strong back member 22 has a top portion 59 such that, with the vane strip assembly 116 positioned in cascade 10', as seen in FIG. 14 and secured, for example, to nacelle 12 as shown for cascade 10 in FIG. 1, top portion 59 of first side 32 extends in third direction 60 relative to radial direction 62. Radial direction 62 extends from central axis 46 of jet engine 14, as seen in FIG. 8 and is aligned with strong back member 22 positioned closer to central axis 46 of jet engine 14 than top portion 59 of first side 32 of strong back member 22. Third direction 60, represents a direction in which first side 32 extends for this example. Third direction 60, extends in a direction relative to radial direction 62 within an angular range from and including extending parallel with radial direction 62 and up to and to include being angularly displaced sixty degrees from radial direction 62.

In further discussing first strong back member 122 in terms of being similar structure of strong back member 22 in FIG. 8, strong back member 22 can be angularly positioned as chosen and also shown in FIG. 8. Strong back member 22, has second side 50 that has top portion 64 such that, with vane strip assembly 116 as part of cascade 10', as seen in FIG. 14, and vane strip assembly 116 further positioned on nacelle 12 of jet engine 14, as for example shown for cascade 10 in FIG. 1, top portion 64 of second side 50 extends in fourth direction 66 relative to radial direction 62, in another example, which extends from central axis 46 of jet engine 14 and aligned with strong back member 22 positioned closer to central axis 46 of jet engine 14 than top portion 64 of second side 50 of strong back member 22. Fourth direction 66 extends relative to radial direction 62 within an angular range from and to include extending parallel with radial direction 62 and up to and to include being angularly displaced sixty degrees from radial direction 62. The variable positioning by the fabricator of first strong back member 122 or strong back member 22, as described herein, allows cascade 10 or 10' to direct thrust exhaust in a side direction, as desired, relative to nacelle 12.

Figure 16:
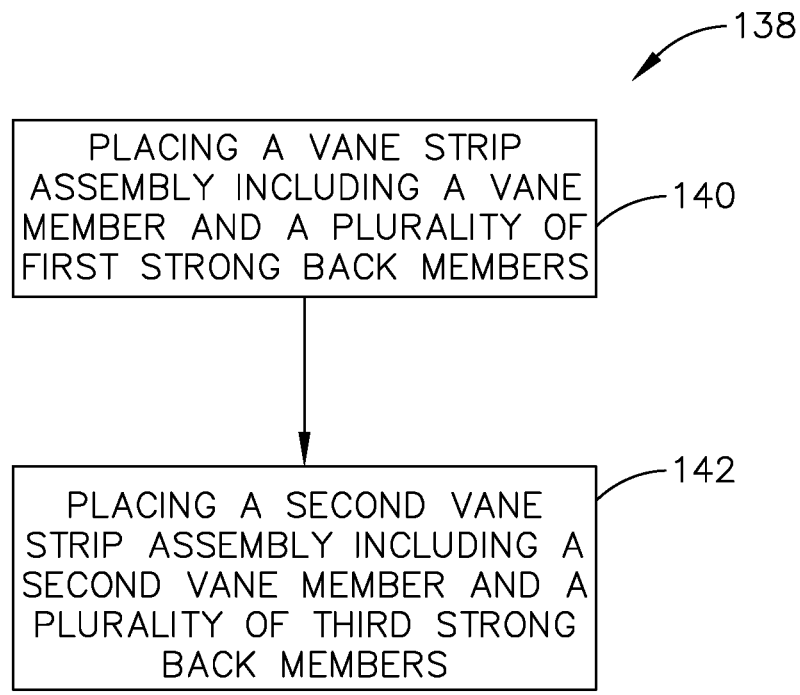
FIG. 16 is a flow chart of another method for manufacturing a cascade for a thrust reverser for a jet engine of FIG. 13.

In referring to FIG. 16, method 138 for assembling cascade 10' for a thrust reverser for a jet engine 14 includes step 140 for placing vane strip assembly 116 into a first position, as seen in FIG. 15. Vane strip assembly 116 includes vane member 118 which includes length 120. Vane strip assembly 116 further includes plurality of first strong back members 122 which extend from first side 124 of vane member 118 in first direction 123 nonparallel relative to length 120 of vane member 118. First strong back members 122 are spaced apart from one another along length 120 of vane member 118 as seen in FIG. 15.

Method 138 of FIG. 16 further includes step 142 for placing second vane strip assembly 116' into a second position, as seen in FIG. 15, wherein second vane strip assembly 116' includes second vane member 118' which includes length 120. Second vane strip assembly 116' further includes plurality of second strong back members 132' which extend from second side 134' of second vane member 118' in second direction 146 nonparallel relative to length 120 of second vane member 118'. Plurality of second strong back members 132' are spaced apart from one another along length 120 of second vane member 118'. With vane strip assembly 116 in the first position and second vane strip assembly 116' in the second position, as seen in FIG. 15, wherein the assemblies 116 and 116' are shown separated but are brought together to adjoin one another as seen in FIG. 14, results in at least one first strong back member 122 of plurality of first strong back members 122 adjoins one second strong back member 132' of plurality of second strong back members 132'.

With adjoining vane strip assembly 116 and second vane strip assembly 116' distal ends of first strong back members 122 and third strong back members 132' adjoin. Method 138 of assembling includes a distal end 148 of one of the plurality of first strong back members 122, relative to first side 124 of vane member 118, and distal end 150 of the one of the plurality of third strong back members 132', relative to second side 134' of the second vane member 118', adjoin one another in one of the following discussed configurations. In one configuration example, distal end 148 of one of the first strong back members 122, as seen in FIG. 15, extends along in a first plane 152 and distal end 150 of the one of third strong back members 132' extends along in second plane 154, wherein first plane 152 and second plane 154 extend in the same direction which includes one of a wide selection of directions.

Figure 17:
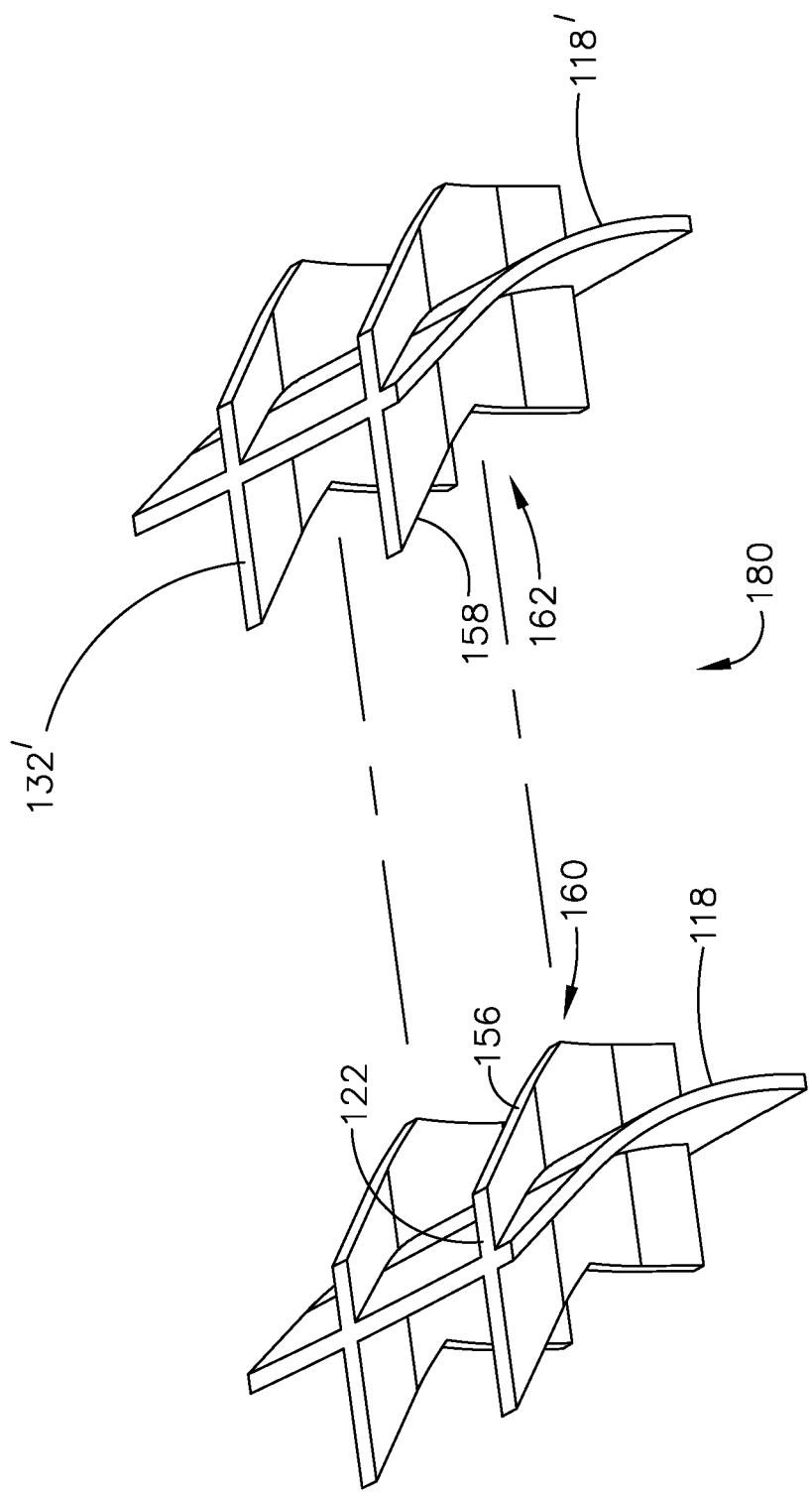
FIG. 17 is a partial perspective blown apart view of two adjoining vane strip assemblies of an assembled cascade of FIG. 13 showing a second example of a configuration of adjoining distal end portions of strong back members of a strong back assembly positioned between adjoining vane strip assemblies.

In another example of a configuration of distal ends, distal end 156 of one first strong back member 122 of plurality of first strong back members 122 or distal end 158 of one second strong back member 132' of the plurality of second strong back members 132' defines an angularly shaped configuration 160. In the example shown in FIG. 17 the angular configuration 160 is associated with distal end 156 of first strong back member 122. Distal end of the other of the one first strong back member of the plurality of first strong back members 122 or of the one second strong back member 132' of the plurality of second strong back members 132' defines a complementary shape 162 relative to the angularly shaped configuration 160. In the example shown in FIG. 17 the complementary shape 162 is associated with distal end 158 of second strong back member 132'. This alignment of distal ends can be reversed such that angularly shaped configuration 160 could be associated with distal end 158 and the complementary shape 162 could be associated with distal end 156.

Figure 18:
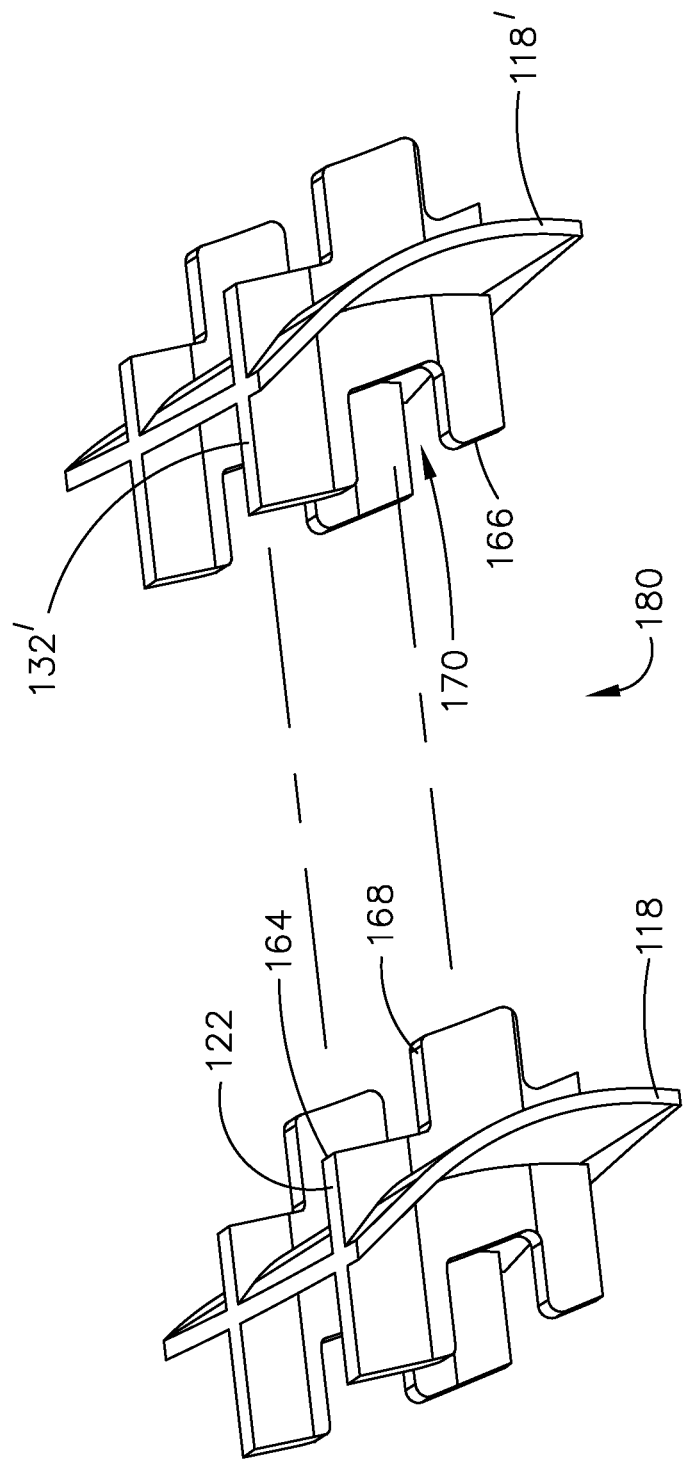
FIG. 18 is a partial perspective blown apart view of two adjoining vane strip assemblies from an assembled cascade showing a third example of a configuration of adjoining distal end portions of strong back members of a strong back assembly positioned between adjoining vane strip assemblies.

In yet another example of a configuration, as shown in FIG. 18, distal end of one first strong back member 122 of the plurality of first strong back members 122 or a distal end of the one second strong back member 132' of the plurality of second strong back members 132' defines a protrusion 168 and the distal end of the other of the one first strong back member 122 of the plurality of first strong back members 122 or of the one second strong back member 132' of the plurality of the second strong back members 132' defines notch 170, wherein protrusion 168 and notch 170 are complementary in shape to one another permitting interlocking of one first strong back member 122 of the plurality of the first strong back member 122 and the one second strong back member 132' of the plurality of the second strong back member 132'. In the example shown in FIG. 18, the protrusion 168 is associated with distal end 164 of first strong back member 122 and notch 170 is associated with distal end 166 of second strong back member 132'. The alignment of distal ends can be reversed such that protrusion 168 can be associated with distal end 166 and notch 170 can be associated with distal end 164.

As seen in FIGS. 14 and 15, reverse thruster cascade 10', includes vane strip assembly 116 which includes vane member 118 including plurality of first strong back members 122 which extend from first side 124 of vane member 118. Second vane strip assembly 116' includes second vane member 118' including a plurality of second strong back members 132' which extend from second side 134' of second vane member 118'. Vane strip assembly 116 is secured at opposing end portions 172, 174 of vane strip assembly 116 to nacelle 12, as seen for cascade 10 in FIG. 1. Second vane strip assembly 116' is secured at opposing end portions 176, 178 of second vane strip assembly 116' to nacelle 12, as also seen for cascade 10 in FIG. 1. With each of vane strip assembly 116 and second vane assembly 116' secured to nacelle 12 a distal end 148, for example as seen in FIG. 15, of one first strong back member 122 of the plurality of first strong back members 122 adjoins distal end 150 of one second strong back member 132' of the plurality of second strong back members 132'

As discussed earlier, at least one of vane member 118 and second vane member 118' include a curvilinear surface 128 wherein curvilinear surface 128 forms recess 130 facing forward position 20. This is seen in FIG. 15 and shown as well in FIG. 19. Vane member 118 a top portion 126 of curvilinear surface 128 extends in surface direction 44 nonparallel relative to central axis 46 of jet engine 14 such that, with vane strip assembly 116 positioned on nacelle 12 of jet engine 14, such as seen for example in FIG. 1. Surface direction 44 forms an angle A relative to central axis 46 of jet engine 14 in a range from and including thirty degrees and up to and to include ninety degrees.

One of the plurality of first strong back members 122 and one second strong back member 132' of the plurality of second strong back members 132', as seen in FIGS. 14 and 15, extend in alignment with one another forming strong back assembly 180 between vane strip assembly 116 and second vane strip assembly 116'. In this example, adjoining first strong back member 122 and third strong back member 132' forming a strong back assembly 180 will often have similar curvature configurations with respect to one another such as to direct engine exhaust from strong back assembly 180 in a desired direction laterally with respect to engine 14.

First strong back member 122 includes, as earlier discussed as being similar in structure as strong back member 22 and shown in FIG. 8, a first side 32 and second side 50 opposing first side 32. First side 32 of first strong back member 122 has top portion 59 such that with vane strip assembly 116 positioned on nacelle 12 of jet engine 14, top portion 59 of first side 32 extends in third direction 60 relative to radial direction 62. Radial direction 62 extends from central axis 46 of jet engine 14 aligned with first strong back member 122 positioned closer to central axis 46 of jet engine 14 than top portion 59 of first side 32 of first strong back member 122. Third direction 60, in this example, is angularly positioned with respect to radial direction 62 in an angular range, from and include parallel to radial direction 62 and up to and to include up to being angularly displaced sixty degrees from parallel with radial direction 62.

Second side 50, as seen in FIG. 8, strong back member 22, which is similarly structured to first strong back members 122, has top portion 64 such that with vane strip assembly 116 positioned on nacelle 12 of jet engine 14, as seen for example with respect to cascade 10 in FIG. 1, top portion 64 of second side 50 extends in fourth direction 66 relative to radial direction 62. Radial direction 62 extends from central axis 46 of jet engine 14 aligned with strong back member 22, as seen in FIG. 8, positioned closer to central axis 46 of jet engine 14 than top portion 64 of second side 50 of strong back member 22 and similarly for first strong back member 122. Fourth direction 66, in this example, is angularly positioned with respect to radial direction 62 in an angular range, from and to include parallel to radial direction 62 and up to and to include up to being angularly displaced sixty degrees from parallel with radial direction 62.

As discussed earlier and shown in FIGS. 15, 17 and 18. distal end 148 of one first strong back member 122 of a plurality of the first strong back members 122 and distal end 150 of one second strong back member 132' of the plurality of second strong back members 132' adjoin one another in one of the following configurations discussed herein. In one example of a configuration, as seen in FIG. 15, distal end 148 of one first strong back member 122 of the plurality of first strong back members 122 extend along in first plane 152 and distal end 150 of the one second strong back member 132' of the plurality of second strong back members 132' extend along in a second plane 154 wherein first plane 152 and second plane 154 extend in the same direction.

In another example of a configuration of distal ends, distal end 156 of one first strong back member 122 of plurality of first strong back members 122 or distal end 158 of one second strong back member 132' of the plurality of second strong back members 132' defines an angularly shaped configuration 160. In the example shown in FIG. 17 the angular configuration 160 is associated with distal end 156 of first strong back member 122. Distal end of the other of the one first strong back member 122 of the plurality of first strong back members 122 or of the one second strong back member 132' of the plurality of second strong back members 132' defines a complementary shape 162 relative to the angularly shaped configuration 160. In the example shown in FIG. 17 the complementary shape 162 is associated with distal end 158 of second strong back member 132'. This alignment of distal ends can be reversed such that angularly shaped configuration 160 could be associated with distal end 158 and the complementary shape 162 could be associated with distal end 156.

In yet another example of a configuration, as shown in FIG. 18, distal end of one first strong back member 122 of the plurality of first strong back members 122 or a distal end of the one second strong back member 132' of the plurality of second strong back members 132' defines a protrusion 168 and the distal end of the other of the one first strong back member 122 of the plurality of first strong back members 122 or of the one second strong back member 132' of the plurality of the second strong back members 132' defines notch 170, wherein protrusion 168 and notch 170 are complementary in shape to one another permitting interlocking of one first strong back member 122 of the plurality of the first strong back member 122 and the one second strong back member 132' of the plurality of the second strong back member 132'. In the example shown in FIG. 18, the protrusion 168 is associated with distal end 164 of first strong back member 122 and notch 170 is associated with distal end 166 of second strong back member 132'. The alignment of distal ends can be reversed such that protrusion 168 can be associated with distal end 166 and notch 170 can be associated with distal end 164.

Reverse thruster cascade 10' as shown in FIGS. 14 and 15 includes vane strip assembly 116 which includes vane member 118 including a plurality of first strong back members 122 which extend from first side 124 of vane member 118. Cascade 10' further includes second vane strip assembly 116' including second vane member 118' including a plurality of third strong back members 132' which extend from second side 134' of second vane member 118. Vane strip assembly 116 is secured at opposing end portions 172, 174 of vane strip assembly 116 to nacelle 12 with a securement commonly used for securement to nacelle 12. Second vane strip assembly 116' is secured at opposing end portions 176, 178 of second vane strip assembly 116' to nacelle 12, also with a securement commonly used for securement to nacelle 12, such that with each of vane strip assembly 116 and second vane strip assembly 116' secured to nacelle 12 a distal end 148 of one of plurality of first strong back members 122 adjoins distal end 150 of one of the plurality of third strong back members 132'.

While various embodiments have been described above, this disclosure is not intended to be limited thereto. Variations can be made to the disclosed embodiments that are still within the scope of the appended claims.

What is claimed:

1. A method for manufacturing a cascade for a thrust reverser for a jet engine, comprising:
   forming a first strip assembly, wherein the first strip assembly comprises:
      a first strong back member comprising a length; and
      a plurality of first vane members which extend from a first side of the first strong back member in a first direction nonparallel relative to the length of the first strong back member, wherein:
         the plurality of first vane members are spaced apart from one another along the length of the first strong back member;
         two consecutive first vane members of the plurality of first vane members and the first strong back member form a three sided open configuration; and
         at least one of the plurality of first vane members comprises a curvilinear surface wherein the curvilinear surface forms a recess facing a forward direction; and
      a plurality of second vane members which extend from a second side of the first strong back member, opposing the first side of the first strong back member, in a second direction nonparallel relative to the length of the first strong back member, wherein:
         the plurality of second vane members are spaced apart from one another along the length of the first strong back member; and
         two consecutive second vane members of the plurality of second vane members and the first strong back member form a three sided open configuration.

2. The method of claim 1, wherein a top portion of the curvilinear surface extends in a surface direction nonparallel relative to a central axis of the jet engine such that, with the first strip assembly positioned on a nacelle of the jet engine, the surface direction forms an angle relative to the central axis of the jet engine in a range, from and including thirty degrees and up to and to include ninety degrees.

3. The method of claim 1, wherein forming the first strip assembly further includes forming a front portion of the first strong back member which extends from the first side of the first strong back member.

4. The method of claim 3, further including forming a second strip assembly including forming a second front portion which extends from a second side of a second strong back member.

5. The method of claim 4, further including positioning the first strip assembly in a first position and the second strip assembly in a second position adjoining the front portion of the first strong back member with the second front portion of the second strong back member.

6. The method of claim 1, further including securing opposing end portions of the first strip assembly to a nacelle.

7. The method of claim 1, further including forming a distal end of the plurality of first vane members to extend along a first plane.

8. The method of claim 1, further including forming a distal end of the plurality of first vane members to extend along in an angularly shaped configuration.

9. The method of claim 1, further including forming a distal end of the plurality of first vane members to be one of a protrusion or a notch configuration.

10. A method for manufacturing a cascade for a thrust reverser for a jet engine, comprising:
   forming a strip assembly, wherein the strip assembly comprises:
      a strong back member comprising a length;
      a plurality of first vane members which extend from a first side of the strong back member in a first direction nonparallel relative to the length of the strong back member, wherein:
         the plurality of first vane members are spaced apart from one another along the length of the strong back member; and
         two consecutive first vane members of the plurality of first vane members and the strong back member form a three sided open configuration; and
      a plurality of second vane members which extend from a second side of the strong back member, opposing the first side of the strong back member, in a second direction nonparallel relative to the length of the strong back member, wherein:
         the plurality of second vane members are spaced apart from one another along the length of the strong back member; and
         two consecutive second vane members of the plurality of second vane members and the strong back member form a three sided open configuration.

11. The method of claim 10, wherein one first vane member of the plurality of first vane members and one second vane member of the plurality of second vane members extend in alignment with one another.

12. The method of claim 11, wherein each first vane member of the plurality of the first vane members is positioned to extend from the strong back member in alignment with one second vane member of the plurality of the second vane members.

13. The method of claim 10, wherein a length of one first vane member of the plurality of first vane members and a length of one second vane member of the plurality of second vane members are positioned in angular relationship to one another.

14. The method of claim 10, wherein at least one second vane member of the plurality of the second vane members comprises a curvilinear surface wherein the curvilinear surface forms a recess which faces a front portion of the strip assembly.

15. The method of claim 14, wherein a top portion of the curvilinear surface extends in a surface direction nonparallel relative to a central axis of the jet engine such that, with the strip assembly positioned on a nacelle of the jet engine, the-surface direction forms an angle relative to a central axis of the jet engine in a range, from and including thirty degrees and up to and to include ninety degrees.

16. A method for manufacturing a cascade for a thrust reverser for a jet engine, comprising:
   forming a strip assembly, wherein the strip assembly comprises:
      a strong back member comprising a length; and
      a plurality of first vane members which extend from a first side of the strong back member in a first direction nonparallel relative to the length of the strong back member, wherein:
         the plurality of first vane members are spaced apart from one another along the length of the strong back member; and
         two consecutive first vane members of the plurality of first vane members and the strong back member form a three sided open configuration;
      a plurality of second vane members which extend from a second side of the strong back member, opposing the first side of the strong back member, in a second direction nonparallel relative to the length of the strong back member, wherein:
         the plurality of second vane members are spaced apart from one another along the length of the strong back member; and
         two consecutive second vane members of the plurality of second vane members and the strong back member form a three-sided open configuration, wherein:
            the first side extends along the length of the strong back member and extends transverse to the length of the strong back member;
            the first side of the strong back member has a top portion, such that with the strip assembly positioned on a nacelle of the jet engine, the top portion of the first side extends in a third direction relative to a radial direction;
            the radial direction extends from a central axis of the jet engine and aligns with a bottom portion of the strong back member positioned closer to the central axis of the jet engine than the top portion of the first side of the strong back member;
            the third direction extends relative to the radial direction within an angular range, from and including extending parallel with the radial direction and up to and to include being angularly displaced sixty degrees from the radial direction;
            the second side opposing the first side extends along the length of the strong back member and extends transverse to the length of the strong back member; and the second side of the strong back member has a top portion, such that with the strip assembly positioned on the nacelle of the jet engine, the top portion of the second side extends in a fourth direction relative to the radial direction;

the radial direction extends from the central axis of the jet engine and aligns with the bottom portion of the strong back member positioned closer to the central axis of the jet engine than the top portion of the second side of the strong back member; and the fourth direction extends relative to the radial direction within an angular range, from and including extending parallel with the radial direction and up to and to include being angularly displaced sixty degrees from the radial direction.

17. A method of assembling a cascade for a thrust reverser for a jet engine, comprising the steps of:

placing a first strip assembly into a first position wherein the first strip assembly comprises:
 a first strong back member comprising a length;
 a plurality of first vane members which extend from a first side of the first strong back member in a first direction nonparallel relative to the length of the first strong back member, wherein:
  the plurality of the first vane members are spaced apart from one another along the length of the first strong back member;
  two consecutive first vane members of the plurality of first vane members and the first strong back member form a three sided open configuration; and placing a second strip assembly into a second position wherein the second strip assembly comprises:
 a second strong back member comprising a length; and
 a plurality of second vane members which extend from a second side of the second strong back member in a second direction nonparallel relative to the length of the second strong back member wherein:
  the plurality of second vane members are spaced apart from one another along the length of the second strong back member; and
  with the first strip assembly in the first position and the second strip assembly in the second position, one first vane member of the plurality of first vane members adjoins one second vane member of the plurality of second vane members.

18. The method of assembling of claim 17, wherein a distal end of the one first vane member of the plurality of first vane members relative to the first side of the first strong back member and a distal end of the one second vane member of the plurality of second vane members relative to the second side of the second strong back member, adjoin one another in one of the following configurations:

the distal end of the one first vane member of the plurality of the first vane members extends along in a first plane and the distal end of the one second vane member of the second plurality of vane members extends along in a second plane wherein the first plane and the second plane extend in the same direction; or the distal end of the one first vane member of the plurality of first vane members or the distal end of the one second vane member of the plurality of second vane members defines an angularly shaped configuration and the distal end of the other of the one first vane member of the plurality of first vane members or of the one second vane member of the plurality of second vane members defines a complementary shape relative to the angularly shaped configuration; or the distal end of the one first vane member of the plurality of first vane members or the distal end of the one second vane member of the plurality of second vane members defines a protrusion and the distal end of the other of the one first vane member of the plurality of first vane members or of the one second vane member of the plurality of the second vane members defines a notch wherein the protrusion and the notch are complementary in shape to one another interlocking the one first vane member of the plurality of the first vane members and the one second vane member of the plurality of the second vane members.

19. The method of assembling of claim 17 further includes the one first vane member of the plurality of first vane members extends away from the first side of the first strong back member toward the second strong back member and the one second vane member of the plurality of second vane members extends away from the second side of the second strong back member toward the first strong back member positioning the one first vane member of the plurality of the first vane members and the one second vane member of the plurality of second vane members in angular relationship to one another.

20. The method of assembling of claim 17, wherein:

the first strong back member includes a front portion which extends from the first side of the first strong back member; and the second strong back member includes a second front portion which extends from the second side of the second strong back member and with the first strip assembly in the first position and the second strip assembly in the second position the front portion of the first strong back member adjoins the second front portion of the second strong back member, wherein a distal end of the front portion of the first strong back member and a distal end of the second front portion of the second strong back member adjoin one another in one of the following configurations:

the distal end of the front portion of the first strong back member extends in a first plane and the distal end of the second front portion of the second strong back member extends in a second plane wherein the first plane and the second plane extend in the same direction; or one of the distal end of the front portion of the first strong back member or the distal end of the second front portion of the second strong back member defines an angularly shaped configuration and the other of the distal end of the front portion of the first strong back member or the distal end of the second front portion of the second strong back member defines a complementary shape to the angularly shaped configuration; or one of the distal end of the front portion of the first strong back member or the distal end of the second front portion of the second strong member defines a protrusion and the other of the distal end of the front portion of the first strong back member or the second front portion of the second strong back member defines a notch wherein the protrusion and the notch are complementary in shape to one another interlocking the front portion of the first strong back member and the second front portion of the second strong back member.

\* \* \* \* \*